US010095262B2

(12) United States Patent
Valley et al.

(10) Patent No.: US 10,095,262 B2
(45) Date of Patent: Oct. 9, 2018

(54) SYSTEMS AND METHODS FOR PERFORMING LINEAR ALGEBRA OPERATIONS USING MULTI-MODE OPTICS

(71) Applicant: The Aerospace Corporation, El Segundo, CA (US)

(72) Inventors: George C. Valley, Los Angeles, CA (US); Thomas Justin Shaw, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 24 days.

(21) Appl. No.: 15/376,500

(22) Filed: Dec. 12, 2016

(65) Prior Publication Data

US 2018/0165248 A1 Jun. 14, 2018

(51) Int. Cl.
*G06F 17/16* (2006.01)
*G06E 1/00* (2006.01)

(52) U.S. Cl.
CPC .................................... *G06E 1/00* (2013.01)

(58) Field of Classification Search
None
See application file for complete search history.

(56) References Cited

U.S. PATENT DOCUMENTS 2,747,038 A 5/1956 Perkovich
4,851,840 A 7/1989 McAulay
5,488,354 A 1/1996 Bobby
5,568,127 A 10/1996 Bang
6,236,862 B1 5/2001 Erten et al.
6,326,910 B1 12/2001 Hayduk et al.
6,346,124 B1 2/2002 Geiser et al.
6,404,366 B1 6/2002 Clark et al.
6,445,487 B1 9/2002 Roddy et al.
6,724,334 B2 4/2004 Tzelnick
6,801,147 B2 10/2004 Thylen et al.
(Continued)

OTHER PUBLICATIONS

Akulova et al., "10 Gb/s Mach-Zender modulator integrated with widely-tunable sampled grating DBR Laser," Proc. OFC 2004, paper No. TuE4, Los Angeles, CA: 3 pages (2004).
(Continued)

*Primary Examiner* — David H Malzahn
(74) *Attorney, Agent, or Firm* — Jones Day; Jaime D. Choi

(57) ABSTRACT

Under one aspect, a method for performing a linear algebra operation includes imposing matrix elements onto a chirped optical carrier; inputting into a multi-mode optic the matrix elements imposed on the chirped optical carrier; outputting by the multi-mode optic a speckle pattern based on the matrix elements imposed on the optical carrier; and performing a linear algebra operation on the matrix elements based on the speckle pattern. The matrix elements can be from matrix A and a vector b, and the multi-mode optic can optically transform each of matrix A and vector b by a speckle transformation S, so as to output a speckle pattern including elements of a matrix SA of dimension p,n and matrix elements of a vector Sb of dimension p. The linear algebra operation can include generating $\tilde{x}=(SA)^{\dagger}Sb$, wherein † indicates a pseudo-inverse operation.

32 Claims, 10 Drawing Sheets
(1 of 10 Drawing Sheet(s) Filed in Color)

(56) References Cited

U.S. PATENT DOCUMENTS

| | | | | |
|---|---|---|---|---|
| 7,321,731 | B2 | 1/2008 | Ionov et al. | |
| 7,536,431 | B2 | 5/2009 | Goren et al. | |
| 7,834,795 | B1 | 11/2010 | Dudgeon et al. | |
| 8,026,837 | B1 | 9/2011 | Valley et al. | |
| 8,260,442 | B2 | 9/2012 | Christensen et al. | |
| 8,902,069 | B2 | 12/2014 | Valley et al. | |
| 9,413,372 | B1 | 8/2016 | Valley et al. | |
| 2002/0126981 | A1 | 9/2002 | Roddy et al. | |
| 2002/0154375 | A1 | 10/2002 | Roddy et al. | |
| 2008/0015440 | A1 | 1/2008 | Shandas et al. | |
| 2008/0062028 | A1 | 3/2008 | Chang | |
| 2009/0121882 | A1 | 5/2009 | Al-Mutairi | |
| 2010/0201345 | A1 | 8/2010 | Gupta et al. | |
| 2010/0241378 | A1 | 9/2010 | Baraniuk et al. | |
| 2011/0234436 | A1 | 9/2011 | Bogoni et al. | |
| 2014/0147013 | A1 | 5/2014 | Shandas et al. | |
| 2014/0240163 | A1 | 8/2014 | Boufounos | |
| 2014/0266826 | A1* | 9/2014 | Valley | H03M 1/12 341/137 |
| 2015/0036021 | A1 | 2/2015 | Gigan et al. | |
| 2018/0165248 | A1* | 6/2018 | Valley | G06E 1/00 |

OTHER PUBLICATIONS

Beck et al., "A fast iterative shrinking-thresholding algorithm for linear inverse problems," SIAM Journal on Imaging Sciences 2(1): 183-202 (2009).

Bortnik et al., "Predistortion technique for RF-photonic generation of high-power ultrawideband arbitrary waveforms," J. Lightwave Technology 24(7):2752-2759 (2006).

Bosworth et al., "High-speed ultrawideband compressed sensing of sparse radio frequency signals," CLEO: 2014, OSA Technical Digest (online) (Optical Society of America, 2014), paper SM1G.6 (4 pages).

Bosworth et al., "High-speed ultrawideband photonically enabled compressed sensing of sparse radio frequency signals," Opt. Lett. 38(22):4892-4895 (2013).

Candes et al., "Near Optimal Signal Recovery From Random Projections: Universal Encoding Strategies?" IEEE Trans. on Information Theory 52(12):5406-5425 (2006) Submitted Oct. 2004, Revised Mar. 2006.

Candes et al., An Introduction to Compressive Sampling [A sensing/sampling paradigm that goes against the common knowledge in data acquisition], IEEE Signal Processing Magazine, vol. 25 No. 2, 21-30 (Mar. 2008).

Chen et al., "Atomic decomposition by basis pursuit," SIAM Journal on Scientific Computing 20(1): 33-61 (1998).

Chi et al., "Microwave spectral analysis based on photonic compressive sampling with random demodulation," Opt. Lett. 37(22):4636-4638 (2012).

Chou et al., "Adaptive RF-Photonic Arbitrary Waveform Generator," IEEE Photonics Technology Letters 15(4): 581-583 (2003).

Chou et al., "Photonic bandwidth compression front end for digital oscilloscopes," J. Lightwave Technology 27 (22):5073-5077 (2009).

Coldren et al., "High-efficiency 'receiverless' optical interconnects," Proc. GOMACTech, paper No. 9.4, Monterey, CA: 2 pages (2004).

Coldren et al., "Tunable Semiconductor Lasers: A Tutorial," Journal of Lightwave Technology 22(1):193-202 (2004).

Coldren, "Scalable and Reliable Photonic Integrated Circuits for Scalable and Reliable WDM Networks," Proc. Contemporary Photonics Technology Conference, paper No. A1, Tokyo, Japan: 2 pages (2004).

Dong et al., "Scaling up Echo-State Networks with Multiple Light Scattering," arXiv preprint arXiv:1609.05204 (2016). [retrieved on Sep. 15, 2016]. (5 pages).

Donoho, "Compressed Sensing," IEEE Trans. on Information Theory 52(4):1289-1306 (2006) (Epub Sep. 14, 2014).

Drineas et al., "RandNLA: Randomized Numerical Linear Algebra," Communications of the ACM 59(6): 80-90 (Jun. 2016).

Fish et al., "Wavelength Agile, Integrated Analog Optical Transmitters," Proc. GOMACTech, Monterey, CA: 225-228 (2004).

Gupta et al., "Power scaling in time stretch analog-to-digital converters," Proceedings of Avionics, Fiber-Optics and Phototonics and Photonics Technology Conference, AVFOP '09. IEEE, pp. 5-6 (Sep. 22-24, 2009).

Horisaki et al., "Learning-based imaging through scattering media," Optics Express 24(13):13738-13743 (2016).

Johansson et al., "High-Speed Optical Frequency Modulation in a Monolithically Integrated Widely-Tunable Laser—Phase Modulator," Proc. OFC 2004, paper No. FL2, Los Angeles, CA: 3 pages (2004).

Johansson et al., "Monolithically integrated 40GHz pulse source with >40nm wavelength tuning range," Proc. Integrated Photonics Research, paper No. IPD4, San Francisco, CA: 3 pages (2004).

Johansson et al., "Sampled-grating DBR laser integrated with SOA and tandem electroabsorption modulator for chirp-control," Electronics Letters 40(1): 2 pages (2004).

Koh et al., "A Millimeter-Wave (40-45 GHz) 16-Element Phased-Array Transmitter in 0.18-µm SiGe BiCMOS Technology," IEEE Journal of Solid-State Circuits, 44(5):1498-1509 (2009).

Lee et al., "33MHz Repetition Rate Semiconductor Mode-Locked Laser Using eXtreme Chirped Pulse Oscillator," Conference on Lasers and Electro-Optics/Quantum Electronics and Laser Science Conference and Photonic Applications Systems Technologies, OSA Technical Digest (CD), 2 pages (Optical Society of America, 2008), paper CTuU7.

Lee et al., "Extreme Chirped Pulse Oscillator (XCPO) Using a Theta Cavity Design," IEEE Photonics Technology Letters 18(7):799-801 (2006).

Loris, Ignace, "L1Packv2: A Mathematica package for minimizing an $\ell$1-penalized functional," pp. 1-17 (Aug. 20, 2008); [retrieved online on Aug. 20, 2008] from the Internet <URL: http://adsabs.harvard.edu/abs/2008CoPhC.179..895L>.

Mahoney, "Randomized algorithms for matrices and data," Foundation and Trends in Machine Learning, Now Publishers: 1-54 (2011).

McKenna et al., "Wideband Photonic Compressive Sampling Analog-to-Digital Converter for RF Spectrum Estimation," in Proceedings of Optical Fiber Communication Conference, (Anaheim, Calif., 2013), paper OTh3D.1 (3 pages).

Min, "SiGe/CMOS Millimeter-Wave Integrated Circuits and Wafer-Scale Packaging for Phased Array Systems," A dissertation submitted in partial fulfillment of the requirements for the degree of Doctor of Philosophy in the University of Michigan (2008) (154 pages).

Mishali et al., "From Theory to Practice: Sub-Nyquist Sampling of Sparse Wideband Analog Signals," [retrieved online on Nov. 10, 2009] from the Internet <URL:http://arxiv.org/abs/0902.4291v3>, pp. 1-17.

Redding et al., "All-fiber spectrometer based on speckle pattern reconstruction," Opt. Express 21(5):6584-6600 (2013).

Redding et al., "Evanescently coupled multimode spiral spectrometer." Optica 3.9: 956-962 (2016).

Saade, et al. "Random Projections through multiple optical scattering: Approximating kernels at the speed of light." 2016 IEEE International Conference on Acoustics, Speech and Signal Processing (ICASSP). IEEE, 2016.(pp. 1-6).

Sefler et al., "Holographic Multichannel Radio-Frequency Correlator," Optical Engineering 39(1):260-266 (2000).

Sefler et al., "Wide Bandwidth, High Resolution TimeStretch ADC Scalable to Continuous-Time Operation," Proceedings of Conference on Lasers and Electro-Optics, 2009 and 2009 Conference on Quantum electronics and Laser Science Conference, CLEO/QELS 2009, pp. 1-2 (Jun. 2-4, 2009).

Tropp et al., "Beyond Nyquist: Efficient Sampling of Sparse Bandlimited Signals," IEEE Transactions on Information Theory 56(1):520-544 (2010).

Tropp et al., "Signal recovery from random measurements via orthogonal matching pursuit," IEEE Trans. on Information Theory 53(12): 4655-4666 (2007).

Valley et al., "Applications of the orthogonal matching pursuit/nonlinear least squares algorithm to compressive sensing recovery,"

(56) References Cited

OTHER PUBLICATIONS

Applications of Digital Signal Processing, ed. C. Cuadrado-Laborde, Intech, Croatia (2011): 169-190.
Valley et al., "Compressive sensing of sparse radio frequency signals using optical mixing," Opt. Lett. 37 (22):4675-4677 (2012).
Valley et al., "Multimode waveguide speckle patterns for compressive sensing," Opt. Lett. 41(11):2529-2532 (2016).
Valley et al., "Optical multi-coset sampling of GHz-band chirped signals," Proc. SPIE vol. 9362 93620M-1 (Mar. 14, 2015); [retrieved online on Jul. 29, 2015], from the Internet <URL:http://proceedings.spiedigitallibrary.org/>, pp. 1-7.
Valley et al., "Optical time-domain mixer," in Optics and Photonics for Information Processing IV, Abdul Ahad Sami Awwal; Khan M. Iftekharuddin; Scott C. Burkhart, Editors, Proceedings of SPIE vol. 7797 (SPIE, Bellingham, WA 2010), 77970F.
Valley et al., "Sensing RF signals with the optical wideband converter," in Broadband Access Communication Technologies VII, Benjamin B. Dingel; Raj Jain; Katsutoshi Tsukamoto, Editors, Proceedings of SPIE vol. 8645 (SPIE, Bellingham, WA 2013), 86450P.
Valley, "Photonic Analog to Digital Converters," Optics Express 15(5):1955-1982 (2007).
Walden, "Analog-to-digital conversion in the early 21st century," Wiley Encyclopedia of Computer Science and Engineering, (edited by Benjamin Wah) Hoboken: John Wiley & Sons, Inc., pp. 1-14 (Sep. 9, 2008).
Wang et al., "Efficient, Integrated Optical Transmitters for High-Speed Optical Interconnect Applications," Proc. IEEE/LEOS Workshop on Interconnections Within High Speed Digital Systems, Santa Fe, NM: 3 pages (2004).
Wei et al., "New Code Families for Fiber-Bragg-Grating-Based-Spectral-Amplitude-Coding Optical CDMA Systems," IEEE Photonic Technology Letters 13(8):890-892 (2001).
Xiao et al., "Programmable Photonic Microwave Filters With Arbitrary Ultra-Wideband Phase Response," IEEE Trans. Microwave Theory and Technique 54(11):4002-4008 (2006).
Yin et al., "Multifrequency radio frequency sensing with photonics-assisted spectrum compression," Opt. Lett. 38 (21):4386-4388 (2013).
USPTO Non-Final Office Action for U.S. Appl. No. 13/830,826, dated May 1, 2014 (7 pages).
USPTO Notice of Allowance for U.S. Appl. No. 12/765,721, dated May 31, 2011 (7 pages).
USPTO Notice of Allowance for U.S. Appl. No. 13/830,826, dated Aug. 21, 2014 (5 pages).

* cited by examiner

SYSTEMS AND METHODS FOR PERFORMING LINEAR ALGEBRA OPERATIONS USING MULTI-MODE OPTICS

STATEMENT OF GOVERNMENT INTEREST

This invention was made with government support under Contract No. FA8802-14-C-0001 awarded by the Department of the Air Force. The government has certain rights in the invention.

FIELD

This application generally relates to systems and methods for performing linear algebra operations.

BACKGROUND

Randomized numerical linear algebra (RNLA) is a recently developed technique for reducing the dimensions of matrices on which linear algebra operations are performed, by using random sampling. For example, "matrix sketching" can include multiplying a matrix by a pseudo random matrix so as to reduce the dimension of the matrix in a linear algebra operation, while retaining important information within the matrix. RNLA techniques can include the matrix multiplication of a wide pseudo random matrix times a tall measurement or data matrix. However, when matrix dimensions can be on the order of 1000s by 100000s or more, multiplying matrices can take a significant amount of computational time.

SUMMARY

Embodiments of the present invention provide systems and methods for performing linear algebra operations using multi-mode optics. For example, optical speckle in a multimode optical waveguide can be used as a photonic hardware accelerator to optically perform matrix multiplication faster, even up to orders of magnitude faster, than presently can be performed computationally. Illustratively, a plurality of matrix elements (such as elements of a matrix and a vector) can be modulated on an optical beam, and random matrix multiplication such as used in RNLA (or matrix sketching) can be performed in a multimode optical waveguide using the properties of time-wavelength mapping and optical speckle. A bank of photodiodes, integrators, and analog-to-digital converters can convert the resulting randomized version of the matrix elements (such as matrix and vector) back into the electronic domain for further processing.

Under one aspect, a method for performing a linear algebra operation includes imposing matrix elements onto a chirped optical carrier; and inputting into a multi-mode optic the matrix elements imposed on the chirped optical carrier. The method also can include outputting by the multi-mode optic a speckle pattern based on the matrix elements imposed on the optical carrier; and performing a linear algebra operation on the matrix elements based on the speckle pattern.

Illustratively, the matrix elements can include matrix elements of a first matrix and a second matrix. Optionally, the first matrix can include a matrix A of dimension m,n; the second matrix can include a vector b of dimension m; and the linear algebra operation can include approximating the equation Ax=b. Optionally, the multi-mode optic optically transforms each of matrix A and vector b by a speckle transformation S. Optionally, the speckle pattern output by the multi-mode optic can include matrix elements of a matrix SA of dimension p,n and matrix elements of a vector Sb of dimension p; and the linear algebra operation can include generating $\tilde{x}=(SA)^{\dagger}Sb$, where $\tilde{x}$ is approximately equal to x, and wherein † indicates a pseudo-inverse operation. The speckle transformation S optionally includes at least one negative value.

Optionally, the method further includes receiving the speckle pattern output by the multi-mode optic at an array of p optical sensors coupled to n analog-to-digital converters (ADCs), and generating $\tilde{x}=(SA)^{\dagger}Sb$ based on respective digital outputs of the p ADCs. Optionally, the p optical sensors concurrently receive a first portion of the speckle pattern corresponding to matrix elements of a first column of the matrix SA a first time; the p optical sensors concurrently receive a second portion of the speckle pattern corresponding to matrix elements of a second column of the matrix SA at a second time that is different from the first time; the p optical sensors concurrently receive a third portion of the speckle pattern corresponding to matrix elements of the vector Sb at a third time that is different from the first and second times; and the first, second, and third portions of the speckle pattern have different spatial distributions than one another. As a still further option, the matrix elements of the first column of the matrix SA can be imposed on one or more first pulses of the chirped optical carrier; the matrix elements of the second column of matrix SA can be imposed on one or more second pulses of the chirped optical carrier; and the matrix elements of the vector Sb can be imposed on one or more third pulses of the chirped optical carrier.

As additional or alternative options, the multi-mode optic can include a multi-mode guided-wave optic configured so as to control a rank of the speckle transformation S. A length and width of the multi-mode guided-wave optic optionally can be selected so as to control a correlation between columns and rows of the speckle transformation S.

Additionally, or alternatively, at least some of the matrix elements can be imposed onto the chirped optical carrier at different wavelengths than one another. Optionally, at least some of the matrix elements are imposed onto the chirped optical carrier at different times than one another.

Additionally, or alternatively, at least one of the matrix elements optionally has a negative value. The multi-mode optic optionally can transform at least one of the matrix elements by a negative value. Additionally, or alternatively, at least one of the matrix elements optionally has a positive value. The multi-mode optic optionally can transform at least one of the matrix elements by a positive value. In still further options, at least one of the matrix elements can have a negative value. The multi-mode optic and optical sensors can transform at least one of the matrix elements.

Under another aspect, a system for performing a linear algebra operation includes a modulator configured to impose matrix elements onto a chirped optical carrier; and a multi-mode optic configured to receive the matrix elements imposed on the chirped optical carrier and to output a speckle pattern based on the matrix elements imposed on the chirped optical carrier. The system also can include a processor configured to perform a linear algebra operation on the matrix elements based on the speckle pattern.

Optionally, the matrix elements can include matrix elements of a first matrix and a second matrix. Optionally, the first matrix can include a matrix A of dimension m,n; the second matrix can include a vector b of dimension m; and the linear algebra operation can include numerically approximating the equation Ax=b. The multi-mode optic optionally can be configured to optically transform each of matrix A and vector b by a speckle transformation S. The speckle pattern output by the multi-mode optic optionally can include matrix elements of a matrix SA of dimension p,n and matrix elements of a vector Sb of dimension p; and the linear algebra operation optionally can include generating $\tilde{x}=(SA)^{\dagger}Sb$, where $\tilde{x}$ is approximately equal to x, and wherein † indicates a pseudo-inverse operation. The multi-mode optic optionally is configured such that the speckle transformation S include at least one negative value.

The system optionally also can include an array of p optical sensors coupled top analog-to-digital converters (ADCs), the p optical sensors being configured to receive the speckle pattern output by the multi-mode optic, the p ADCs each respectively being configured to generate a digital output based on the speckle pattern received by the optical sensor coupled thereto, and the processor being configured to generate $\tilde{x}=(SA)^{\dagger}Sb$ based on the digital outputs of the p ADCs. The p optical sensors optionally can be configured to receive concurrently a first portion of the speckle pattern corresponding to matrix elements of a first column of the matrix SA a first time; the p optical sensors optionally can be configured to receive concurrently a second portion of the speckle pattern corresponding to matrix elements of a second column of the matrix SA at a second time that is different from the first time; the p optical sensors optionally can be configured to receive concurrently a third portion of the speckle pattern corresponding to matrix elements of the vector Sb at a third time that is different from the first and second times; and the first, second, and third portions of the speckle pattern can have different spatial distributions than one another. In one optional configuration, the matrix elements of the first column of the matrix SA are imposed on one or more first pulses of the chirped optical carrier; the matrix elements of the second column of matrix SA are imposed on one or more second pulses of the chirped optical carrier; and the matrix elements of the vector Sb are imposed on one or more third pulses of the chirped optical carrier.

Additionally, or alternatively, the multi-mode optic can include a multi-mode guided-wave optic configured so as to control a rank of the speckle transformation S. Optionally, a length and width of the multi-mode guided-wave optic are selected so as to control a correlation between columns and rows of the speckle transformation S.

Additionally, or alternatively, at least some of the matrix elements can be imposed onto the chirped optical carrier at different wavelengths than one another. At least some of the matrix elements can be imposed onto the chirped optical carrier at different times than one another.

In still further options, at least one of the matrix elements can have a negative value. The multi-mode optic can transform at least one of the matrix elements by a negative value. Additionally, or alternatively, at least one of the matrix elements optionally has a positive value. The multi-mode optic optionally can transform at least one of the matrix elements by a positive value. In still further options, at least one of the matrix elements can have a negative value. The multi-mode optic and optical sensors can transform at least one of the matrix elements.

In yet another aspect, an integrated system for performing a linear algebra operation is provided. The integrated system can include a substrate; a source of a chirped optical carrier; and a modulator configured to impose matrix elements onto the chirped optical carrier. The integrated system also can include a multi-mode optic defined within the substrate and configured to receive the chirped optical carrier having the matrix elements imposed thereon and to output a speckle pattern based on the chirped optical carrier having the matrix elements imposed thereon. The integrated system also can include an array of optical sensors configured to be irradiated with the speckle pattern; and a linear algebra processor coupled to the array of optical sensors and configured to perform the linear algebra operation based on the speckle pattern.

In one optional configuration, one or more of the source, the modulator, the linear algebra processor, and the optical sensor are defined in or disposed on the substrate.

BRIEF DESCRIPTION OF THE DRAWINGS

The patent or application file includes at least one drawing executed in color. Copies of this patent or patent application publication with color drawing(s) will be provided by the Office upon request and payment of the necessary fee.

DETAILED DESCRIPTION

Figure 1A:
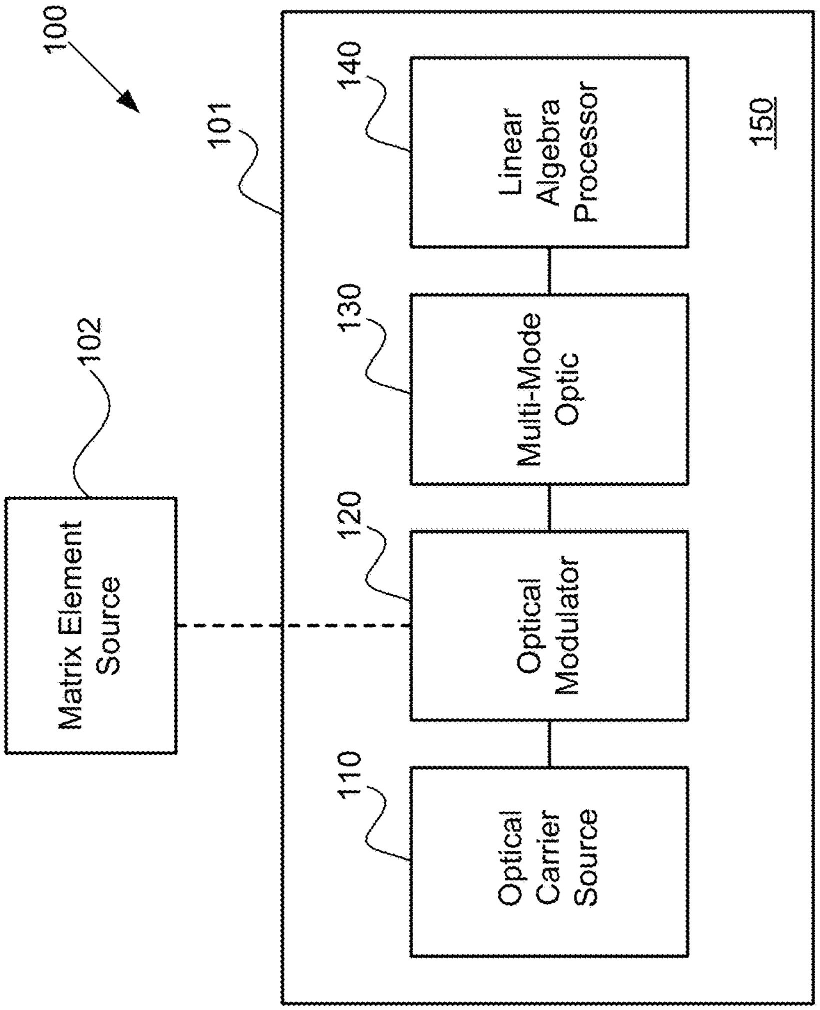
FIGS. 1A-1B schematically illustrate exemplary systems for performing a linear algebra operation using a multi-mode optic, according to one exemplary configuration.

Embodiments of the present invention include systems and methods for performing linear algebra operations using multi-mode optics. Elements of the matrix or matrices to be operated upon can be converted into the optical domain, e.g., imposed on a chirped optical carrier. A multi-mode optic can receive the matrix elements imposed on the chirped optical carrier, and based thereon can transform the matrix elements by a speckle transformation that can reduce the size of the matrix or matrices to be operated upon. The linear algebra operation can be performed in the digital domain based upon the reduced-dimension matrix or matrices, optionally using randomized numerical linear algebra (RNLA) techniques.

An exemplary numerical linear algebra problem can include approximating a solution to the equation:

$$Ax=b \tag{1}$$

for the vector x, given A and b under conditions in which A is a relatively large, tall matrix of dimension m,n (for example, m=40,000 rows by n=2000 columns) and b is a relatively large vector of dimension m (for example, with m=40,000 elements). Illustratively, m can be 1,000 or more, e.g., in the range of 1,000 to 1,000,000, or more. Additionally, or alternatively, n can be 100 or more, e.g., in the range of 100 to 100,000, or more.

The least squares solution for such an overdetermined problem is obtained with the pseudoinverse $A^\dagger$ such that $x=A^\dagger b$. For large matrices A, computing the pseudoinverse can be computationally intensive. In comparison, such linear algebra operations can be accelerated by multiplying both sides of equation (1) by a pseudo-random matrix S of dimension p,m to obtain a matrix SA of dimension p,n and a vector Sb of dimension p, and approximately solving the reduced dimensionality equation:

$$SAx=Sb \tag{2}$$

for x. For example, the linear algebra operation can include generating the solution:

$$\tilde{x}=(SA)^\dagger Sb \tag{3}$$

where $\tilde{x}$ is approximately equal to x. In a nonlimiting example where p=n, the matrix SA is square, and the solution for x can be obtained using the matrix inverse of the n by n matrix SA provided SA has a good condition number.

The systems and methods provided herein can provide further accelerations of such linear algebra operations by performing certain of said operations in the optical domain, using time/wavelength mapping. For example, the matrix elements being operated upon can be imposed on an optical carrier, such as a chirped optical carrier, and can include matrix elements of a first matrix and a second matrix. Illustratively, the first matrix can include matrix A of dimension m,n and the second matrix can include vector b of dimension m, and the linear algebra operation can include approximating the equation Ax=b. According to the present systems and methods, elements of such matrices can be imposed on a chirped optical carrier using an optical modulator, e.g., in a manner such as described herein with reference to FIG. 3. A multi-mode optic can be used to optically transform each of matrix A and vector b by a speckle transformation S of dimension p,m, thus obviating the need to perform the matrix operations SA and Sb computationally. For example, the multi-mode optic can output a speckle pattern that includes matrix elements of a matrix SA of dimension p,n and matrix elements of a vector Sb of dimension p. The linear algebra operation can include generating $\tilde{x}=(SA)^\dagger Sb$, where $\tilde{x}$ is approximately equal to x, and wherein † indicates the pseudo-inverse operation. Such linear algebra operation can be performed in the digital domain. For example, an array of p optical sensors can be configured to receive the speckle pattern output by the multi-mode optic, and can be coupled top analog-to-digital converters (ADCs) that respectively are configured to generate a digital output based on the speckle pattern received by the optical sensor coupled thereto. A processor can be configured to generate $\tilde{x}=(SA)^\dagger Sb$ based on the digital outputs of the p ADCs.

As described in greater detail herein, and further below with reference to FIGS. 8A-8B, 9A-9B, 10, and 11, performing certain matrix operations in the optical domain, using hardware such as provided herein, can significantly accelerate linear algebra operations. For example, time-wavelength mapping can facilitate operation of the present system (which can be referred to as a speckle accelerator) as follows. The first column A[1] of A can be modulated as a function of time on the optical carrier (e.g., pulse) in which the wavelength of changes as a function of time (e.g., an optical chirp), such that each element of A[1] can be associated with a unique optical wavelength or wavelength band (time-wavelength mapping). Upon propagation through the multimode optic, each wavelength or wavelength band receives its own spatial speckle intensity at the output of the multimode optic. Following integration in time for a duration equal to the length of the modulation of A[1], A[1] can be multiplied by the speckle intensity S at each wavelength and spatial location in the output plane. For example, for illustrative S and A matrices expressed as:

$$\begin{pmatrix} S[1,1] & S[1,2] & S[1,3] \\ S[2,1] & S[2,2] & S[2,3] \end{pmatrix} \text{ and } \begin{pmatrix} A[1,1] & A[1,2] \\ A[2,1] & A[2,2] \\ A[3,1] & A[3,2] \end{pmatrix}$$

propagation through the multimode optical and integration for the duration of the modulation $$A[1] = \begin{pmatrix} A[1,1] \\ A[2,1] \\ A[3,1] \end{pmatrix}$$

yields the products $$\begin{pmatrix} A[1,1]S[1,1] + A[2,1]S[1,2] + A[3,1]S[1,3] \\ A[1,1]S[2,1] + A[2,1]S[2,2] + A[3,1]S[2,3] \end{pmatrix}$$

at two different spatial locations in the output plane of the multimode optic. Similarly, modulation of the second column of A, $$A[2] = \begin{pmatrix} A[1,2] \\ A[2,2] \\ A[3,2] \end{pmatrix},$$

on the second optical pulse, propagation through the multimode guide and integration yield the products $$\begin{pmatrix} A[1,2]S[1,1] + A[2,2]S[1,2] + A[3,2]S[1,3] \\ A[1,2]S[2,1] + A[2,2]S[2,2] + A[3,2]S[2,3] \end{pmatrix}$$

which completes the matrix multiplication SA for this illustrative case.

For details of exemplary RNLA techniques that can be adapted for use with the present systems and methods, see the following references, the entire contents of which are incorporated by reference herein: Mahoney, "Randomized algorithms for matrices and data," Foundation and Trends in Machine Learning, Now Publishers: 1-54 (2011); and Drineas et al., "RandNLA: Randomized Numerical Linear Algebra," Communications of the ACM 59(6): 80-90 (June 2016).

An overview of exemplary systems for performing linear algebra operations using multi-mode optics will be described, along with exemplary signals that can be formed therein. An exemplary method for performing linear algebra operations will be described. Additionally, some illustrative performance characteristics of exemplary multi-mode optics suitable for use in the present systems and methods, and comparative accelerations that can be achieved using the present systems and methods as compared with previously known techniques, will be described.

FIG. 1A schematically illustrates a first exemplary system 100 for performing a linear algebra operation using a multi-mode optic, according to one exemplary configuration. System 100 includes optical carrier source 110; optical modulator 120 coupled to matrix element source 102 and configured to impose matrix elements onto an optical carrier (e.g., chirped optical carrier); multi-mode optic 130 configured to receive the matrix elements imposed on the optical carrier and to output a speckle pattern based on the matrix elements imposed on the chirped optical carrier; linear algebra processor 140 configured to perform a linear algebra operation on the matrix elements based on the speckle pattern; and substrate 150. In some embodiments, system 100 includes housing 101 configured to hold at least optical carrier source 110, optical modulator 120, multi-mode optic 130, and linear algebra processor 140 as illustrated in FIG. 1A. In some embodiments, any suitable number of optical carrier source 110, optical modulator 120, multi-mode optic 130, and linear algebra processor 140, e.g., some or all of optical carrier source 110, optical modulator 120, multi-mode optic 130, and linear algebra processor 140, can be integrated on substrate 150, e.g., can be disposed on or defined in substrate 150. In one nonlimiting example, optical carrier source 110, optical modulator 120, multi-mode optic 130, and at least a portion of linear algebra processor 140 optionally can be disposed on a common substrate 150 (such as an indium phosphate, silicon, silica, or lithium niobate wafer) with one another. Optical carrier source 110, optical modulator 120, multi-mode optic 130, and linear algebra processor 140 can be in operable communication with one another via guided-wave optical elements, such as waveguides or optical fibers, that optionally can be defined within or disposed on the common substrate. In other embodiments, system 100 includes more than one housing 101 or more than one substrate 150, each housing or substrate configured to hold at least one structure in system 100.

Figure 2A:
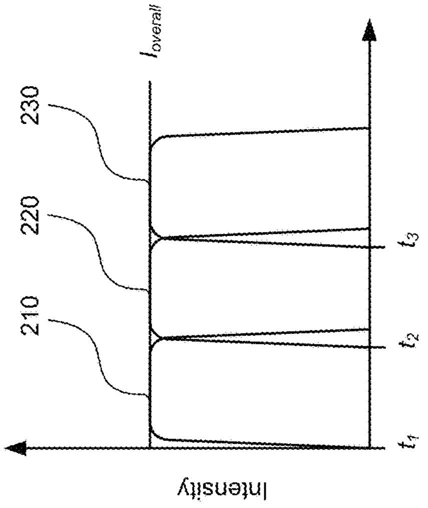
FIG. 2A is a plot illustrating the temporal variations in intensity of three exemplary chirped repetitively pulsed optical signals that can be generated by an optical carrier source.

Optical carrier source 110 illustrated in FIG. 1A can be configured to generate an optical carrier upon which the matrix elements can be imposed. In some embodiments, the optical carrier can include at least one wavelength, e.g., can include a single-frequency laser beam or a multi-frequency laser beam. In some embodiments, the optical carrier can include a plurality of wavelengths, such as an optical pulse, e.g., a chirped optical pulse. For example, the optical carrier can, but need not necessarily, include a chirped, repetitively pulsed optical signal. As used herein, a chirped, repetitively pulsed optical signal is intended to mean a sequence of chirped optical pulses that together have a relatively constant intensity as a function of time and have periodic temporal wavelength variations. FIG. 2A is a plot illustrating the temporal variations in intensity of three exemplary chirped pulses that can be generated by optical carrier source 110 and together can form a chirped, repetitively pulsed optical signal that has a substantially continuous overall intensity in time, as represented by $I_{overall}$. FIG. 2A illustrates three chirped pulses 210, 220, 230 within the signal that begin at times $t_1$, $t_2$, and $t_3$, respectively. After a chirped pulse begins, its intensity increases over time until the intensity levels off at a plateau, e.g., at $I_{overall}$. Chirped pulses 210, 220, 230 can have substantially the same energy as one another and can overlap slightly in the temporal domain. For example, the intensity of pulse 210 begins to decrease after time $t_2$, when pulse 220 begins. Pulses 210 and 220 overlap slightly after time $t_2$, after which the intensity of pulse 210 decreases to zero and the intensity of pulse 220 increases to $I_{overall}$. Preferably, when the pulses overlap, the sum of their intensities is approximately equal to $I_{overall}$. As used herein, the terms "approximately" and "about" mean within 10% of the stated value.

Figure 2B:
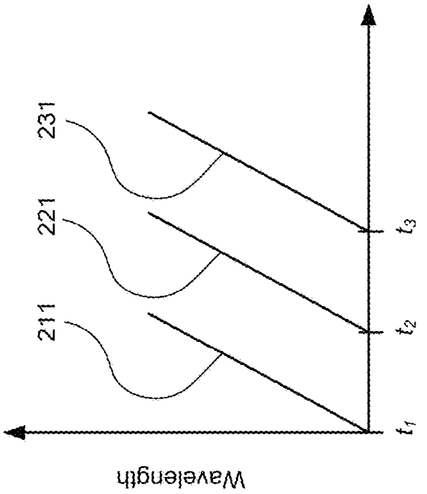
FIG. 2B-2D are plots illustrating temporal variations in wavelength of three exemplary chirped repetitively pulsed optical signals that can be generated by an optical carrier source, e.g., the temporal wavelength variations of the three chirped repetitively pulsed optical signals illustrated in FIG. 2A.

FIG. 2B is a plot illustrating the temporal variations in wavelength of three exemplary chirped pulses that can be generated by optical carrier source 110, e.g., the temporal wavelength variations of the three chirped pulses 210, 220, 230 illustrated in FIG. 2A. For example, chirped pulses 210, 220, 230 respectively can have temporal wavelength profiles 211, 221, 231 which, as illustrated in FIG. 2B, can begin at times $t_1$, $t_2$, $t_3$ and overlap slightly with one another in the temporal domain. To generate temporal wavelength profiles 211, 221, 231, an optical component such as dispersion compensating fiber or a chirped grating, e.g., a chirped fiber Bragg grating (CFBG), can be arranged so that the short-wavelength components of the optical pulse travel a shorter path than do the long-wavelength components. After transmission through or reflection from the grating, the optical pulse becomes linearly positively chirped, that is, the long-wavelength components lag behind the short-wavelength components in time in a linear manner.

Figure 2C:
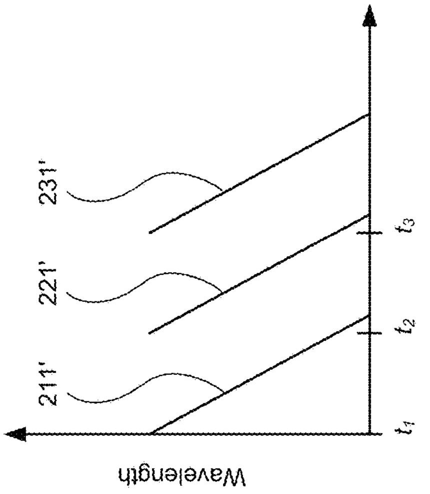

FIG. 2C is a plot illustrating the temporal variations in wavelength of three exemplary linearly negatively chirped pulses that can be generated by optical carrier source 110, e.g., the temporal wavelength variations of the three pulses 210, 220, 230 illustrated in FIG. 2A. In this example, chirped pulses 210, 220, 230 respectively can have temporal wavelength profiles 211', 221', 231' which, as illustrated in FIG. 2C, can begin at times $t_1$, $t_2$, $t_3$ and overlap slightly with one another in the temporal domain. To generate temporal wavelength profiles 211', 221', 231', an optical component such as dispersion compensating fiber or a chirped grating, e.g., a CFBG, can be arranged so that the long-wavelength components of the optical pulse travel a shorter path than do the short-wavelength components. After transmission through the optical component, the optical pulse becomes negatively chirped, that is, the short-wavelength components lag behind the long-wavelength components in time in a linear manner.

Figure 2D:
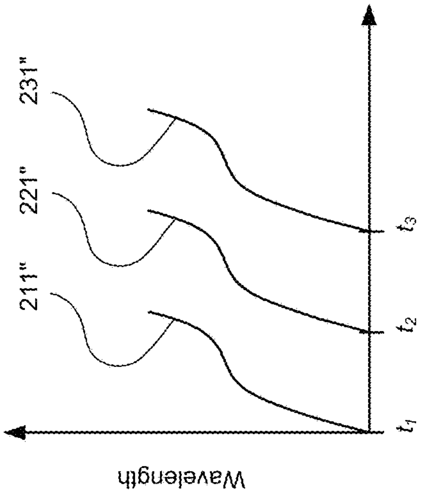

FIG. 2D is a plot illustrating the temporal variations in wavelength of three exemplary nonlinearly positively chirped pulses that can be generated by optical carrier source 110, e.g., the temporal wavelength variations of the three pulses 210, 220, 230 illustrated in FIG. 2A. In this example, chirped pulses 210, 220, 230 respectively can have temporal wavelength profiles 211", 221", 231" which, as illustrated in FIG. 2D, are positively chirped in a manner analogous to that illustrated in FIG. 2B, but have wavelengths that vary nonlinearly with time. Optical components such as CFBGs for either positively or negatively nonlinearly chirping optical pulses are known.

Referring again to FIG. 1A, optical carrier source 110 can include a laser, such as a continuous-wave laser configured to generate a single frequency, or a suitably pulsed laser, such as a mode-locked laser, fiber laser, titanium-doped sapphire (Ti: Sapphire) solid-state laser, diode laser, or dye laser, or any other suitable optical source. In some embodiments, the laser can be configured so as to generate an optical pulse including a plurality of wavelengths, e.g., at least one chirped optical pulse, and optionally so as to generate a chirped, repetitively pulsed optical signal, without the need for an additional optical component, such as a swept frequency laser or a distributed Bragg reflector laser. Alternatively, a separate optical component can be provided for chirping an optical pulse (or a repetitive sequence of such pulses) generated by a laser or other suitable optical source. Such an optical component can include a guided-wave optical component, and can include, for example, a grating such as a chirped FBG, a dispersion compensating fiber (DCF), or a standard optical fiber. In embodiments in which optical carrier source 110 includes a pulsed laser, the laser can be transform-limited, so as to produce ultrafast pulses (e.g., 1 picosecond at full width at half maximum (FWHM) or less) at a high bandwidth (e.g., 10 nm at FWHM or more), and the optical component can be configured to temporally disperse the bandwidth of at least one of those pulses, and optionally to temporally disperse each of those pulses such that the pulses temporally overlap with one another, resulting in a substantially uniform overall intensity $I_{overall}$ such as illustrated in FIG. 2A. In some embodiments, the pulsed laser can have a repetition rate of at least 1 MHz, or at least 10 MHz, or at least 100 MHz, or at least 1 GHz, resulting in a suitable interpulse period (time difference between $t_2$ and $t_1$, and between $t_3$ and $t_2$). For example, a pulsed laser with a repetition rate of about 100 MHz has an interpulse period of about 10 ns. In some embodiments, optical carrier source 110 is a femtosecond (fs) class laser configured to generate laser pulses having a FWHM in the range of 1 fs to 1000 fs, e.g., between 10 fs to 100 fs at FWHM, optionally associated with a chirped FBG configured to positively linearly or negatively linearly chirp and temporally disperse the pulses in a manner analogous to that illustrated in FIGS. 2A-2C. Additional exemplary sources for the optical carrier source 110 can include, but are not limited to, an optical comb source, a time and wavelength interleaved optical source, and a supercontinuum source.

In one illustrative embodiment, optical carrier source 110 can include a theta laser such as disclosed in Shinwook Lee et al., *Extreme Chirped Pulse Oscillator* (*XCPO*) *Using a Theta Cavity Design*, IEEE Photonics Technology Letters, Vol. 18, No. 7, 799-801 (Apr. 1, 2006), the entire contents of which are incorporated by reference herein. The theta laser disclosed in Lee includes two optical circulators, an intensity modulator, an output coupler, a bandpass filter, a polarization controller, a semiconductor optical amplifier, an electric comb generator, and chirped FBG. The theta laser can be used to generate a sequence of chirped optical pulses.

Still other exemplary chirped optical carrier sources suitable for use as optical carrier source 110 are described in the following references, the entire contents of each of which are incorporated by reference herein: Coldren et al., "Tunable Semiconductor Lasers: A Tutorial," Journal of Lightwave Technology 22(1): 193-202 (2004); Coldren, "Scalable and Reliable Photonic Integrated Circuits for Scalable and Reliable WDM Networks," Proc. Contemporary Photonics Technology Conference, paper no. A1, Tokyo, Japan: 2 pages (2004); Johansson et al., "Sampled-grating DBR laser integrated with SOA and tandem electroabsorption modulator for chirp-control," Electronics Letters 40(1): 2 pages (2004); Johansson et al., "High-Speed Optical Frequency Modulation in a Monolithically Integrated Widely-Tunable Laser—Phase Modulator," Proc. OFC 2004, paper no. FL2, Los Angeles, Calif.: 3 pages (2004); Akulova et al., "10 Gb/s Mach-Zender modulator integrated with widely-tunable sampled grating DBR Laser," Proc. OFC 2004, paper no. TuE4, Los Angeles, Calif.: 3 pages (2004); Fish et al., "Wavelength Agile, Integrated Analog Optical Transmitters," Proc. GOMACTech, Monterey, Calif.: 225-228 (2004); Coldren et al., "High-efficiency 'receiverless' optical interconnects," Proc. GOMACTech, paper no. 9.4, Monterey, Calif.: 2 pages (2004); Wang et al., "Efficient, Integrated Optical Transmitters for High-Speed Optical Interconnect Applications," Proc. IEEE/LEOS Workshop on Interconnections Within High Speed Digital Systems," Santa Fe, N. Mex.: 3 pages (2004); Johansson et al., "Monolithically integrated 40 GHz pulse source with >40 nm wavelength tuning range," Proc. Integrated Photonics Research, paper no. IPD4, San Francisco, Calif.: 3 pages (2004).

Matrix element source 102 is coupled to optical modulator 120, and can be configured to generate elements of one or more matrices to be operated upon. Matrix element source 102 can be any device capable of generating matrix elements, which matrix elements can be received from another component. For example, matrix element source 102 can be configured to receive remotely generated matrix elements via a suitable wired or wireless signaling pathway and to provide those matrix elements to optical modulator 120, e.g., via a wired or wireless signaling pathway (not illustrated). Matrix element source 102 is suitably coupled to optical modulator 120 such that modulator 120 can impose the matrix elements upon the optical carrier generated by optical carrier source 110. Matrix element source 102 need not necessarily be considered to be part of system 100, and indeed can be remote from system 100. Exemplary sources of matrix elements include, but are not limited to, network models, cryptography, computer games, genetic calculations, image processing, computer graphics, coding theory, graph theory, graphical transformations, face morphing, detection and tracking, and compression.

Figure 3:
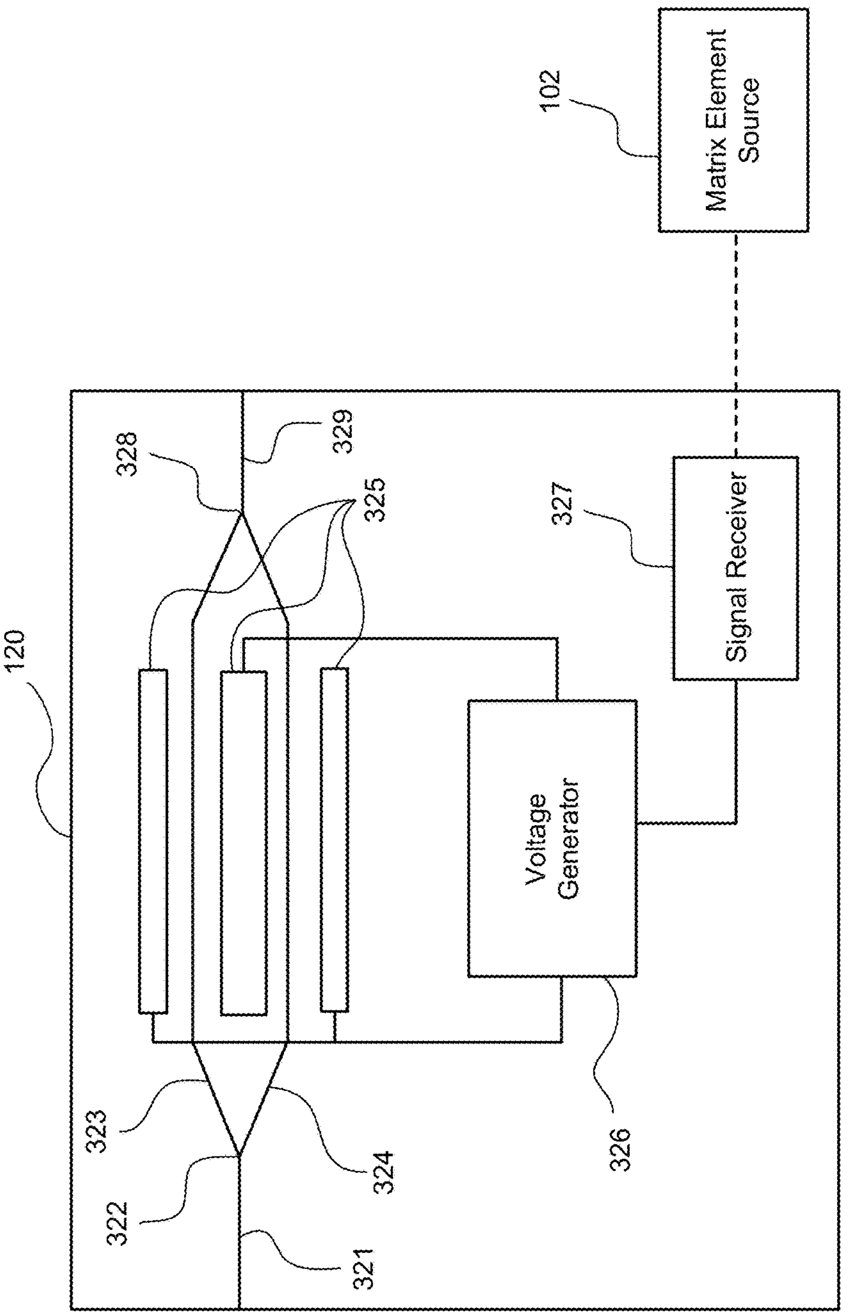
FIG. 3 schematically illustrates an exemplary optical modulator configured to impose matrix elements on a chirped optical carrier, according to one exemplary configuration.

Optical modulator 120 can be configured to impose the matrix elements onto the optical carrier (e.g., chirped optical carrier) generated by optical carrier source 110. As noted above, the matrix elements imposed on the optical carrier can include elements of a first matrix and a second matrix, such as matrix A and vector b described above. For example, FIG. 3 schematically illustrates an exemplary optical modulator 120 that is based on guided-wave optics and is configured to receive matrix elements from matrix element source 102, and to impose the received matrix elements on the optical carrier by modulating the intensity of the optical carrier, according to one exemplary configuration. Optical modulator 120 illustrated in FIG. 3 includes input optical fiber or waveguide 321, electrodes 325, voltage generator 326, signal receiver 327, and output optical fiber or waveguide 329. An optical carrier, such as a chirped optical pulse or a chirped, repetitively pulsed optical signal, from optical carrier source 110 is introduced to optical modulator 120 through input optical fiber or waveguide 321. Junction 322 divides that optical carrier into two portions and respectively guides the portions into sections 323 and 324, each of which can be defined with guided-wave optics such as an optical fiber or waveguide. Electrodes 325 are positioned on either side of sections 323, 324. Voltage generator 326 can be programmed to independently apply voltages to different pairs of electrodes 325 so as to change the phase of the optical carrier portion traveling through the section adjacent to that pair. For example, voltage generator 326 can apply voltages proportional to the signal generated by matrix element source 102 and received by signal receiver 327. Signal receiver 327 can be operatively coupled to voltage generator 326 and can be any structure capable of receiving matrix elements from matrix element source 102, e.g., via a wired or wireless connection.

In optical modulator 120 illustrated in FIG. 3, the two portions of the optical carrier in sections 323, 324 can recombine at junction 328 where they interfere with one another. Because the relative phase of the optical carrier portions traveling through sections 323, 324 can be controlled via voltage generator 326, the intensity of the recombined optical carrier at junction 328 can be modulated based on the signal received by signal receiver 327. For example, if the portion of the optical carrier in section 323 is phase-delayed by an even multiple of $\pi$ relative to that in section 324, then when recombined at junction 328 the two portions of the optical carrier constructively interfere with each other, yielding maximum brightness. Or, for example, if the portion of the optical carrier in section 323 is phase-delayed by an odd multiple of $\pi$ relative to that in section 324, then when recombined at junction 328 the two portions destructively interfere with each other, yielding minimal brightness. The output of optical modulator 120 includes the matrix elements imposed as an intensity modulation on the optical carrier. This output is coupled into a single output optical fiber or waveguide 329. Configurations such as that illustrated in FIG. 3 can be referred to as a Mach-Zehnder modulator (MZM), and can be implemented in a suitable substrate such as lithium niobate or indium phosphate (InP), in which waveguides can be provided that define input 321, junction 322, sections 323 and 324, junction 328, and output 329. Other modulators, such as absorptive modulators based on the Franz-Keldysh effect or the quantum confined Stark effect, or other interferometric modulators, can also suitably be used.

Figure 4:
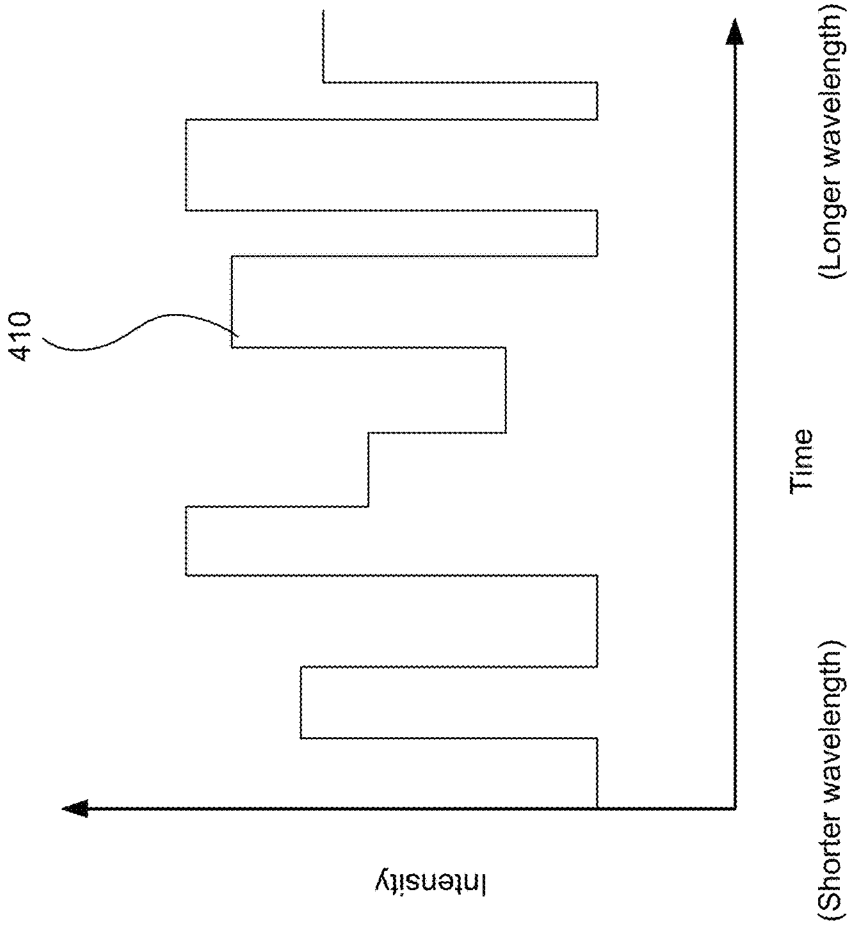
FIG. 4 is a plot illustrating a temporal intensity profile of exemplary matrix elements imposed on a chirped optical carrier, according to one exemplary configuration.
Figure 5A:
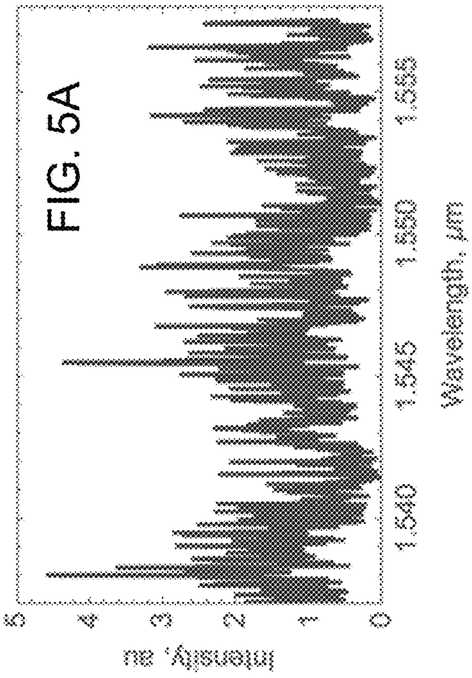
FIGS. 5A-5D schematically illustrate exemplary simulated speckle patterns generated by a multi-mode optic at different wavelengths of a chirped optical carrier at four locations within the output plane of the multi-mode optic, according to one exemplary configuration.
Figure 5B:
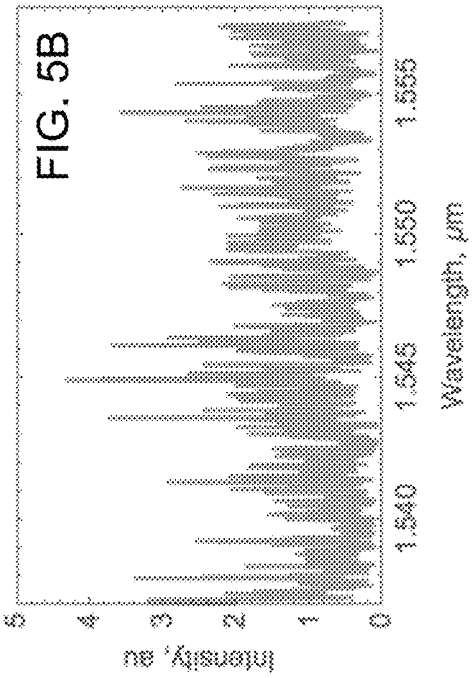
Figure 5C:
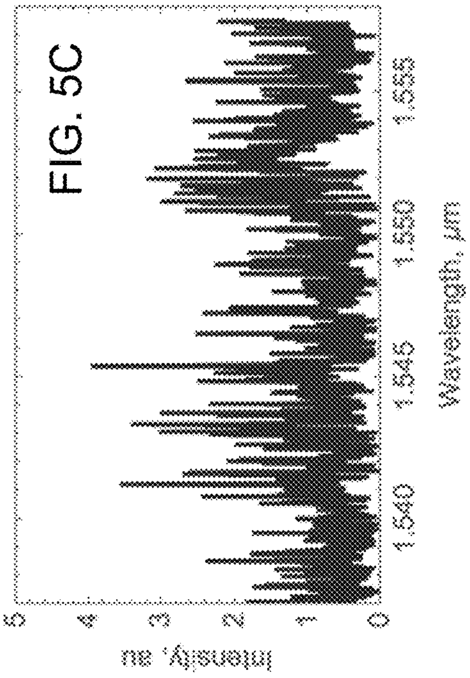
Figure 5D:
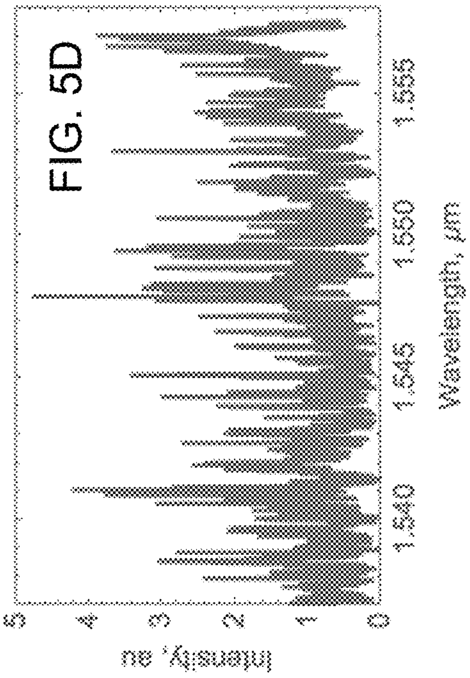

FIG. 4 is a plot illustrating temporal intensity profile 410 of exemplary matrix elements imposed on an optical carrier, e.g., a chirped optical pulse, by optical modulator 120. Temporal intensity profile 410 has varying intensities corresponding to imposition of the matrix elements onto the chirped optical pulse. In this example, the optical pulse is positively chirped, that is, the long-wavelength component lags behind the short-wavelength component in time. The optical pulse instead could be negatively chirped. In other embodiments, the optical carrier can include a single-frequency continuous-wave laser beam, the frequency of which is modified based on the values of the matrix elements.

Note that the matrix elements can be imposed on the optical carrier such that at least some of the matrix elements can be imposed onto the chirped optical carrier at different wavelengths as one another, and optionally can be imposed onto the chirped optical carrier at different times than one another. For example, the matrix elements can be sequentially imposed onto the optical carrier at different times than one another. Illustratively, each individual matrix element of a first column of a matrix sequentially can be imposed onto a chirped optical carrier in sequence, followed by each individual matrix element of a second column of the matrix, and so on. The value of each matrix element can be imposed on the chirped optical carrier as a corresponding intensity level. In configurations in which the matrix elements are binary, then on-off keying can be used to individually impose the matrix elements sequentially on the chirped optical carrier. In another example, a plurality of the matrix elements of a matrix (e.g., a column of the matrix elements) can be encoded using any suitable encoding technique, and the encoded matrix elements imposed onto the chirped optical carrier. Illustratively, higher order modulations that can be used to impose arbitrary matrix element values on an optical carrier include amplitude modulation, pulse width modulation, pulse position modulation, differential phase shifting, code division multiplexing, double-sideband modulation, single-sideband modulation, vestigial sideband modulation, quadrature amplitude modulation, angle modulation, frequency modulation, and phase modulation or any other suitable analog encoding format such as used in the telecommunications industry. Such encoding techniques optionally can include combining any suitable number of matrix elements with one another over a selected bandwidth. Additionally, or alternatively, any suitable number of the matrix elements can have negative values in a manner such as described below with reference to FIG. 1B.

Referring back to FIG. 1A, multi-mode optic 130 receives from optical modulator 120 the matrix elements imposed on the optical carrier. Multi-mode optics can include guided-wave optics and free-space optics. In some embodiments, multi-mode optic 130 includes a multi-mode guided-wave optic. For example, the multi-mode guided-wave optic can include a fiber, or a planar waveguide. The system optionally can include a reticle to couple the output of modulator 120 into multi-mode optic 130. In some configurations, multi-mode optic 130 can include an aberrator and free-space propagation to produce the speckle pattern. Exemplary characteristics of multi-mode optics 130 are provided elsewhere herein and in U.S. Pat. No. 9,413,372 to Valley, the entire contents of which are incorporated by reference herein. For details of another exemplary multi-mode optic that suitably can be used in system 100, see Redding et al., "Evanescently coupled multimode spiral spectrometer." Optica 3.9: 956-962 (2016).

Multi-mode optic 130 is configured so as to output a speckle pattern based on the matrix elements imposed on the optical carrier. By "multi-mode optic" it is meant a passive optical component that supports a plurality of electromagnetic propagation modes for each of a plurality of wavelengths, in which different of such propagation modes coherently interfere with one another so as to produce a speckle pattern. By "speckle pattern" it is meant an irregular, aperiodic pattern in which at least a first portion of the pattern includes an optical intensity profile that is different than an optical intensity profile of at least a second portion of the pattern that is spatially separated from the first portion of the pattern. By "optical intensity profile" it is meant the respective intensities (amplitudes) of different wavelengths in an optical pulse at a selected region of space.

Accordingly, within a speckle pattern output by multi-mode optic 130 illustrated in FIG. 1A, a first wavelength in a first portion of the pattern can have a different intensity than does a second wavelength in the first portion of the pattern, and also can have a different intensity than does the first wavelength in a second portion of the pattern. For example, FIGS. 5A-5D schematically illustrate exemplary simulated speckle patterns generated by a multi-mode optic at different wavelengths of a chirped optical carrier at four locations within the output plane of the multi-mode optic, according to one exemplary configuration. The exemplary speckle patterns illustrated in FIGS. 5A-5D were simulated for a cylindrical silicon on insulator (SOI) fiber for four different locations within the output plane of the fiber, using the simulation method described in Valley et al., "Multi-mode waveguide speckle patterns for compressive sensing," Optics Letters 41(11): 2529-2532 (Jun. 1, 2016), the entire contents of which are incorporated by reference herein. The simulation method was used to calculate a 4000 by 400 speckle transformation matrix S with wavelengths between 1.53 microns and 1.57 microns in steps of 0.00001 microns for a 20 micron wide and 1 meter long SOI waveguide. It can be seen in FIGS. 5A-5D that the speckle pattern as a function of wavelength differed significantly at the four locations.

A length and width of the multi-mode guided-wave optic can be selected so as to control a correlation between columns and rows of the speckle transformation S, and/or the multi-mode guided-wave optic can be configured so as to control a rank of the speckle transformation S. For example, note that multi-mode optics that are insufficiently wide may have an insufficient number of speckle lobes at the output of the optic, and that multi-mode optics that are insufficiently long may have insufficient variation with wavelength to randomize the number of matrix elements. Illustratively, in a multimode waveguide, there exist a large number of spatial modes, each of which has a unique spatial pattern in the direction or directions perpendicular to the guide. The interference of these modes gives rise to a speckle pattern that is generally the same for each optical wavelength at the entrance to the waveguide. Each spatial mode also has a unique phase that is inversely proportional to the optical wavelength and directly proportional to the distance of propagation along the guide. Then as the modes propagate along the guide, the speckle pattern changes and because of the wavelength-dependent phase, the speckle pattern varies from wavelength to wavelength. The longer the guide, the faster the speckle pattern changes with wavelength and this in turn allows more independent columns in the speckle transformation S or a higher rank in S. Likewise, making a guide wider allows it to support a larger number of modes and hence a larger number of independent rows in S or again a higher rank.

Although FIGS. 5A-5D represent optical intensity as a function of wavelength and space for corresponding portions of the speckle pattern, it should be understood that such optical intensities also, equivalently, can be a function of time for such corresponding portions of the speckle pattern. For example, based upon the optical carrier being negatively linearly chirped, multi-mode optic 130 illustrated in FIG. 1A first outputs the longer wavelengths illustrated in FIGS. 5A-5D, followed by longer wavelengths; accordingly, the optical intensity profile for each portion of the speckle pattern, as a function of time, can appear substantially the same along the x-axis as shown in FIGS. 5A-5D. As another example, based upon the optical carrier being positively linearly chirped, multi-mode optic 130 illustrated in FIG. 1A first outputs the shorter wavelengths illustrated in FIGS. 5A-5D, followed by longer wavelengths; accordingly, the optical intensity profile for each portion of the speckle pattern, as a function of time, can appear substantially reverse along the x-axis relative to that shown in FIGS. 5A-5D.

The matrix elements can be recovered based on the speckle pattern. For example, referring again to FIG. 1A, system 100 further can include linear algebra processor 140 configured to perform a linear algebra operation on the matrix elements based on the speckle pattern. In a manner analogous to that described above with reference to FIGS. 5A-5D, a first portion of the speckle pattern can include an optical intensity profile that is different than an optical intensity profile of a second portion of the speckle pattern, and the first portion of the speckle pattern can be spatially separated from the second portion of the speckle pattern. Multi-mode optic 130 imposes the optical intensity profile on the first portion of the speckle pattern as a function of wavelength of the optical carrier upon which the matrix elements is imposed. In some embodiments, the optical carrier upon which the matrix elements is imposed includes a chirped optical pulse.

Linear algebra processor 140 can include at least one optical sensor that multi-mode optic 130 irradiates with a first portion of a speckle pattern, and that generates an analog electronic signal. Additionally, linear algebra processor 140 can include one or more electronic based devices configured to convert analog signals into digital signals, e.g., an analog-to-digital converter (ADC), for further processing. For example, the optical sensor can be coupled to an ADC so as to digitize an electrical output of the optical sensor. Additionally, linear algebra processor 140 can include any suitable device capable of performing linear algebra operations, e.g., a processor, and can include a memory device such as random access memory (RAM), a flash drive, or other recordable medium for storing the output of the ADC(s), as well as the results of the linear algebra operation on the matrix elements.

Figure 6:
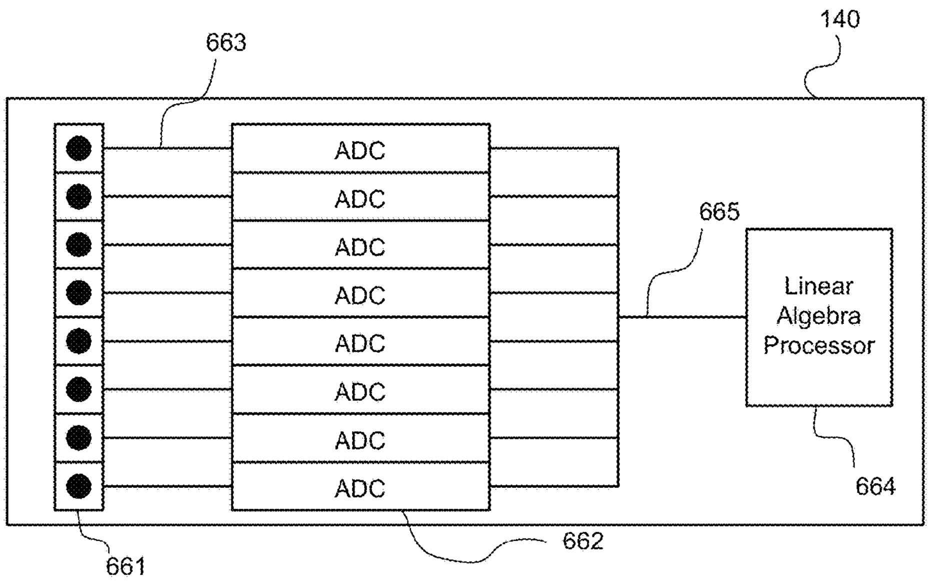
FIG. 6 illustrates components of an exemplary linear algebra processor such as can be used in the systems of any of FIGS. 1A-1B, according to one exemplary configuration.

Exemplary linear algebra processor 140 illustrated in FIG. 6 includes p optical sensors, e.g., photodetectors (PDs) 661, and p analog-to-digital converters (ADCs) 662. The p optical sensors are configured to receive the speckle pattern output by the multi-mode optic. For example, each photodetector 661 receives a portion of the speckle pattern output by multi-mode optic 130 illustrated in FIG. 1A, either directly or via a guided-wave optical element, such as a waveguide or optical fiber. Photodetectors 661 are illustrated as being arranged linearly, but it should be understood that photodetectors 661 can have any suitable arrangement. Photodetectors 661 can include any device configured to convert light into current or voltage, such as a photodiode, and by design can include a low-pass filter. Each photodetector 661 can be configured so as to obtain an electronic representation of a portion of the speckle pattern, which in one example can include elements of matrices SA and Sb described elsewhere herein. For example, the p optical sensors (e.g., photodetectors 661) can be configured to receive concurrently a first portion of the speckle pattern corresponding to matrix elements of a first column of the matrix SA a first time; to receive concurrently a second portion of the speckle pattern corresponding to matrix elements of a second column of the matrix SA at a second time that is different from the first time; and to receive concurrently a third portion of the speckle pattern corresponding to matrix elements of the vector Sb at a third time that is different from the first and second times. The first, second, and third portions of the speckle pattern can have different spatial distributions than one another.

Each photodetector 661 can provide the electronic representation of the respective portion of the speckle pattern to a corresponding one of ADCs 662 via a suitable electronic pathway 663, e.g., a conductor. ADC 662 then generates a digital representation of the corresponding portion of the speckle pattern, and provides that digital representation to processor 664 via a suitable electronic pathway 665, e.g., a conductor. In some embodiments, ADCs 662 are synchronized to optical carrier source 110 illustrated in FIG. 1A. Processor 664 can be configured to generate $\tilde{x}=(SA)^{\dagger}Sb$ based on the digital outputs of the p ADCs, e.g., using suitable computer software, which can be stored in a volatile or non-volatile memory device within linear algebra processor 140, e.g., RAM, ROM, or flash memory, and which can be configured so as to implement RNLA techniques such as described in the Drineas and Mahoney references mentioned elsewhere herein, or otherwise known in the art. In embodiments in which the matrix elements are encoded in a modulation format, linear algebra processor 140 further can be configured to determine the modulation format using suitable computer software stored within a memory device of linear algebra processor 140. Linear algebra processor 140 further can be coupled to a display unit (not illustrated) such as an LED or LCD-based display screen configured to display the results of the linear algebra operation on the matrix elements to a user.

Figure 1B:
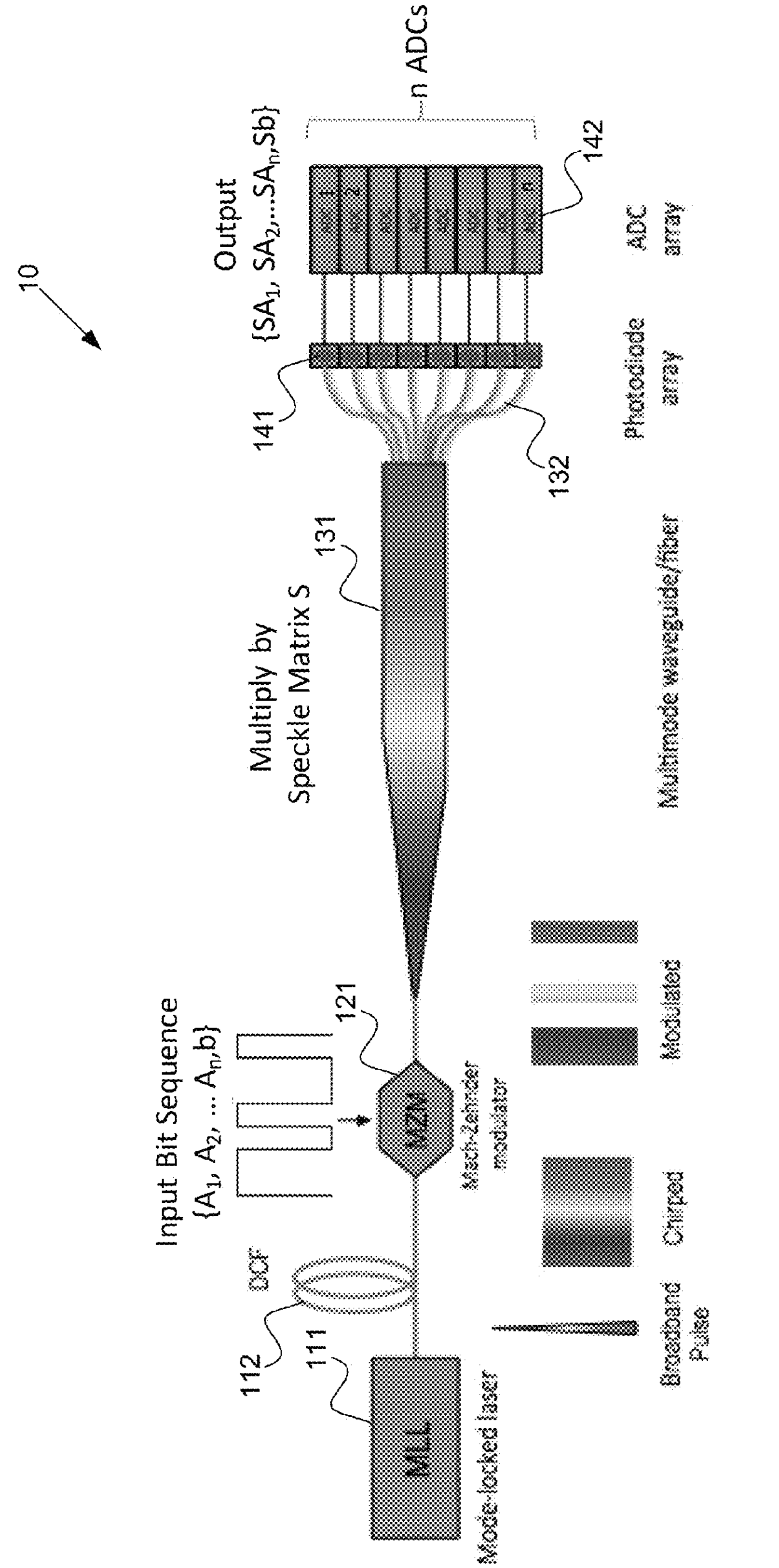

Note that any suitable arrangement and types of optical carrier source 110, optical modulator 120, multi-mode optic 130, linear algebra processor 140, and substrate 150 illustrated in FIG. 1A can be used. For example, in system 10 illustrated in FIG. 1B, the optical carrier source can include a mode-locked laser (MLL) 111 configured to generate broadband optical pulses such as represented in FIG. 1B by the rainbow color components stacked on top of one another from bottom to top and denoted "broadband pulse." In one nonlimiting example, the pulses have a duration in the range of about 100 picosecond to about 1 microsecond, and a repetition rate of about 1 MHz to about 20 GHz. The optical carrier source also can include a dispersive optical element, such as a dispersion compensating fiber (DCF) or chirped fiber Bragg grating (CFBG) 112 configured to chirp the broadband optical pulse such as represented in FIG. 1B by the rainbow components arranged next to each other from right to left and denoted "chirped." Optionally, the DCF, CFBG, or other dispersive element is selected such that the pulses are dispersed to approximately the interpulse time, in a manner such as described with reference to FIGS. 2A-2D. The output of the DCF, CFBG, or other dispersive element can include an optical signal that is relatively constant in intensity, with a wavelength chirp that repeats at the repetition rate of the optical carrier source.

The chirped optical carrier is received by optical modulator 121, such as a Mach-Zehnder modulator (MZM), which imposes matrix elements upon the chirped optical pulse such as represented in FIG. 1B by the rainbow components arranged next to each other from right to left and denoted "modulated." In one nonlimiting example, the elements of matrix A can be imposed on the optical carrier, column by column, serially in time. For example, if A were a square matrix given by $$\begin{pmatrix} 1 & 2 & 3 \\ 4 & 5 & 6 \\ 7 & 8 & 9 \end{pmatrix}$$

then the stream of digits driving the modulator (e.g., MZM) can be {3,6,9,2,5,8,1,4,7}. In an example in which the duration of the pulse for each number in A is $t_{ip}/m$, where $t_{ip}$ is the interpulse time of the laser and m is the large dimension A, the mapping of time onto wavelength in the repetitively chirped optical signal can map each matrix element in a given column of A to a different color in a manner such as shown below modulator 121 in FIG. 1B. Commercially available modulators range have modulation rates up to 100 GHz so for an exemplary laser repetition rate of 10 MHz, such sequential writing of column matrix elements onto a single pulse can accommodate m as large as 10,000. Larger values of m can be accommodated, for example, by using higher order modulation formats or by using two or more pulses for each column of A. In this case the speckle pattern optionally can be different for each successive pulse and this can be achieved by varying the insertion conditions to the waveguide on a pulse to pulse basis or by putting a grating out-coupler on top of the guide sufficiently far back from the output that the speckle pattern is uncorrelated with the output pattern.

The multi-mode optic can include multi-mode waveguide/fiber 131 that receives as input the matrix elements imposed upon the chirped optical pulse, e.g., via a reticle, that optically transforms the matrix elements by a speckle transformation, and outputs (directly, or indirectly via guided-wave optics 132) a speckle pattern to a linear algebra processor that can include photodiode array 141 and ADCs 142 that can be configured analogously as those discussed herein with reference to FIG. 6. In a nonlimiting example in which the imposed matrix elements include matrix elements of a first matrix A of dimension m,n and a second matrix (vector) b of dimension m, the multi-mode optic can optically transform each of matrix A and vector b by a speckle transformation S, e.g., such that the speckle pattern output by the multi-mode optic includes matrix elements of a matrix SA of dimension p,n and matrix elements of a vector Sb of dimension p. The matrix elements of the first column of the matrix SA can be imposed on one or more first pulses of the chirped optical carrier; the matrix elements of the second column of matrix SA can be imposed on one or more second pulses of the chirped optical carrier; and the matrix elements of the vector Sb can be imposed on one or more third pulses of the chirped optical carrier. Photodiode array 141, e.g., p optical sensors, can concurrently receive a first portion of the speckle pattern corresponding to matrix elements of a first column of the matrix SA a first time; can concurrently receive a second portion of the speckle pattern corresponding to matrix elements of a second column of the matrix SA at a second time that is different from the first time; and can concurrently receive a third portion of the speckle pattern corresponding to matrix elements of the vector Sb at a third time that is different from the first and second times. The first, second, and third portions of the speckle pattern can have different spatial distributions than one another. The response time of the optical sensors, e.g., the photodiodes of photodiode array 141, can be selected so as to be approximately the interpulse time $t_{ip}$, such that the optical sensors integrate the product of the modulation and the speckle pattern to complete the transformations SA and Sb. ADCs 142 can provide a digital output of the elements of SA and Sb to a linear algebra processor for use in generating, for example, $\tilde{x}=(SA)^{\dagger}Sb$, where $\tilde{x}$ is approximately equal to x.

Figure 13:
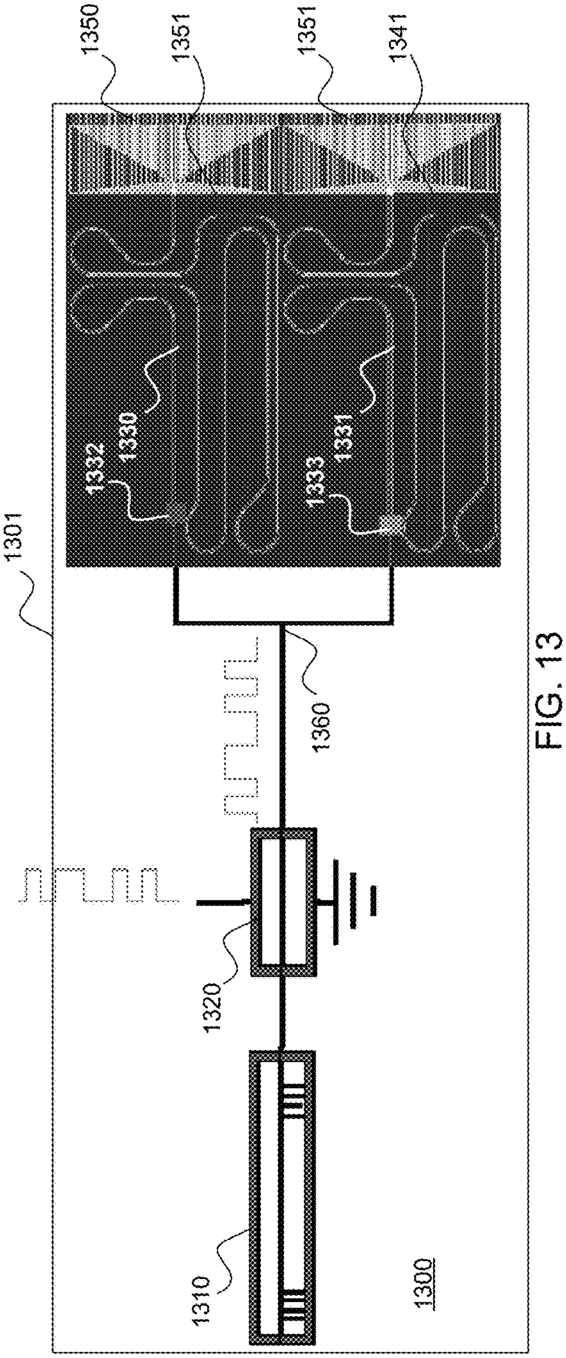
FIG. 13 schematically illustrates components of another integrated system for performing a linear algebra operation, according to one exemplary configuration.

In embodiments in which SA is a square matrix, e.g., where p=n, the number of uncorrelated measurements in the speckle pattern at the output plane of the multi-mode optic 131 can be approximately equal to the small dimension n of A. In one nonlimiting example, a planar waveguide such as described in the Valley article and the Valley patent mentioned elsewhere herein, having 100 independent outputs from a 20 micron SOI wide waveguide can be used. The dimension n can be increased by using a larger waveguide or can be doubled by placing a 50/50 beamsplitter directly after the modulator (e.g., MZM 121), and injecting the modulated optical signal into a second waveguide. Different mode scramblers can be used for each guide, e.g., such as illustrated in FIG. 13 (described further below), such that the speckle patterns are independent.

Note that the exemplary matrix element sequence shown schematically above MZM 121 in FIG. 1B includes 1s and 0s, and the speckle intensity, which is positive, is measured at the photodiode. In one example, if the same calculations as described below with reference to FIGS. 8A-8B and 9A-9B are performed for a matrix A and vector x that each include only randomly placed 1s and 0s, and if S is restricted to include only random real numbers uniformly distributed between 0 and 1, then similar curves can be obtained as shown in FIGS. 8A-8B and 9A-9B. However, there can be a large number of errors because the matrix SA often has a bad condition number. Changing A to a matrix including only random −1, 0, 1 values and/or changing speckle transformation S to a matrix including only random real numbers between −1 and 1, such errors can be reduced or eliminated. Negative numbers can be included in matrices A, b, S, or any other suitable matrix. For example, a matrix A that includes both positive and negative numbers can be expressed as $A=A_+-A_-$ where $A_+=(A+|A|)/2$ and $A_-=(-A+|A|)/2$. The respective columns of $A_+$ and $A_-$ can be imposed on the chirped optical carrier serially in time, and the sign changed electronically after the photodiode for the $SA_-$ terms before they are added to the $SA_+$ terms. To generate an S transformation matrix with positive and negative numbers, two multi-mode optics, e.g., waveguides, respectively with speckle matrices $S_1$ and $S_2$ can be used, and output of the photodiodes can be subtracted so as to obtain $S_1A-S_2A=SA$, e.g., in a manner such as described herein with reference to FIG. 13.

Figure 7:
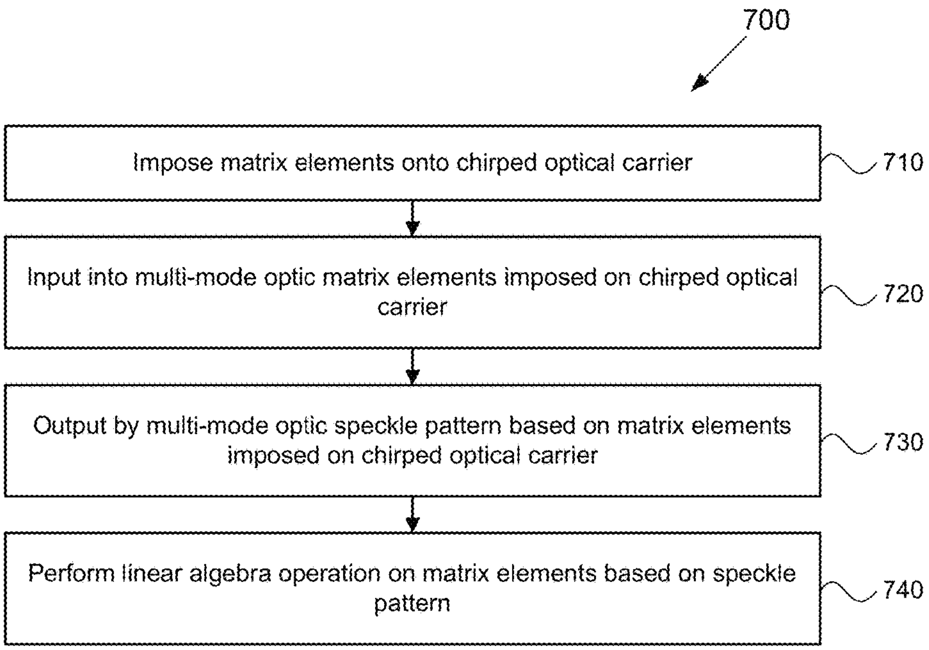
FIG. 7 illustrates steps in an exemplary method for performing a linear algebra operation using a multi-mode optic, according to one example.

It should be appreciated that systems such as described herein with reference to FIGS. 1A-1B and 6 suitably can be used in any suitable method for obtaining a digital representation of matrix elements. FIG. 7 illustrates steps in an exemplary method 700 for performing a linear algebra operation using a multi-mode optic, according to one example. At step 710, matrix elements are imposed onto a chirped optical carrier. The optical carrier can include an optical pulse, such as a chirped optical pulse, such as a chirped repetitively pulsed optical signal, such as described above with reference to FIGS. 2A-2D. The matrix elements can be received and imposed on an optical carrier in a manner such as discussed above with respect to FIGS. 1A-1B, 3, and 4. For example, the matrix elements can be imposed on the optical carrier, e.g., in the form of an intensity modulation of the carrier. Such a modulation of the optical carrier can be considered to provide an optical-domain representation of the matrix elements.

At step 720 of method 700 illustrated in FIG. 7, the matrix elements imposed on the chirped optical carrier can be input into a multi-mode optic, such as described above with reference to FIGS. 1A-1B. The multi-mode optic can include a multi-mode guided-wave optic, such as a fiber or a planar waveguide.

At step 730 illustrated in FIG. 7, the multi-mode optic outputs a speckle pattern based on the matrix elements imposed on the chirped optical carrier. Exemplary characteristics of such a speckle pattern are provided elsewhere herein, e.g., with reference to FIGS. 5A-5D.

At step 740 illustrated in FIG. 7, a linear algebra operation is performed on the matrix elements based on the speckle pattern. For example, step 740 can include irradiating an optical sensor with a first portion of the speckle pattern, the first portion of the speckle pattern including an optical intensity profile that is different than an optical intensity profile of a second portion of the speckle pattern, the first portion of the speckle pattern being spatially separated from the second portion of the speckle pattern. As discussed in greater detail above with reference to FIGS. 5A-5D, the multi-mode optic can output the optical intensity profile on the first portion of the speckle pattern as a function of wavelength of the optical carrier upon which the matrix elements are imposed. The optical intensity profiles of at least the first and second portions of the speckle pattern can provide a speckle transformation S. Step 740 can include obtaining a digitized electrical output of the optical sensor and performing the linear algebra operation based on such output. Such processing can include using a dedicated circuit or a computer. The processing can include running a suitable program for linear algebra operations in software such as Matlab® (The MathWorks, Inc., Natick, Mass.) or Mathematica® (Wolfram Research, Champaign, Ill.). The results of such linear algebra operation can be displayed to a user, e.g., using a suitable display device, such as an LCD or LED display, or can be stored in a computer-readable medium. It should be appreciated that a variety of suitable hardware and software configurations can be used so as to perform such linear algebra operations.

Figure 8A:
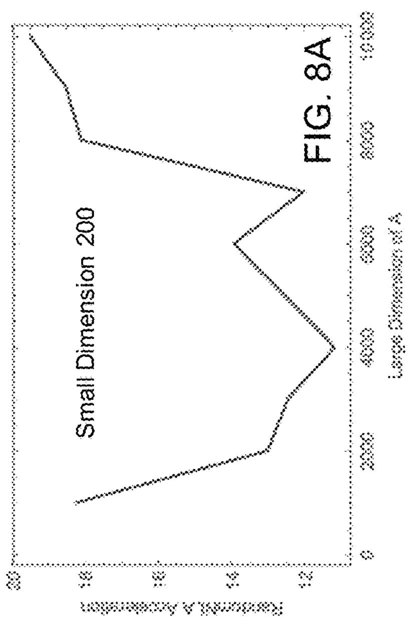
FIGS. 8A-8B illustrate plots of exemplary acceleration that can be achieved using a previously known system for a linear algebra operation.
Figure 8B:
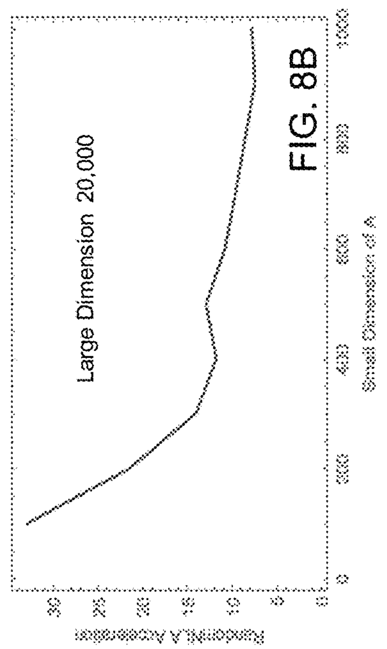
Figure 9A:
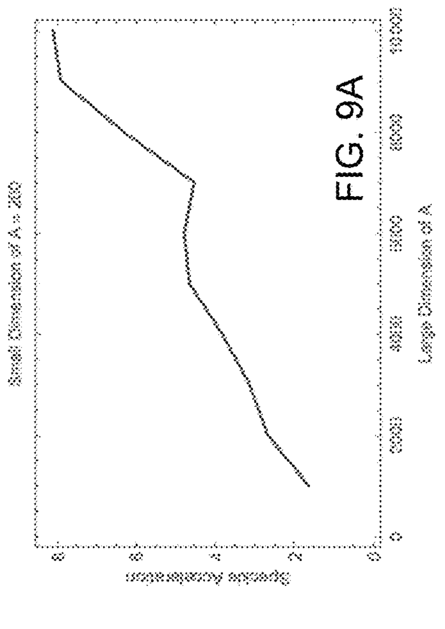
FIGS. 9A-9B illustrate plots of exemplary acceleration that can be achieved using an exemplary configuration of the present systems for a linear algebra operation.
Figure 9B:
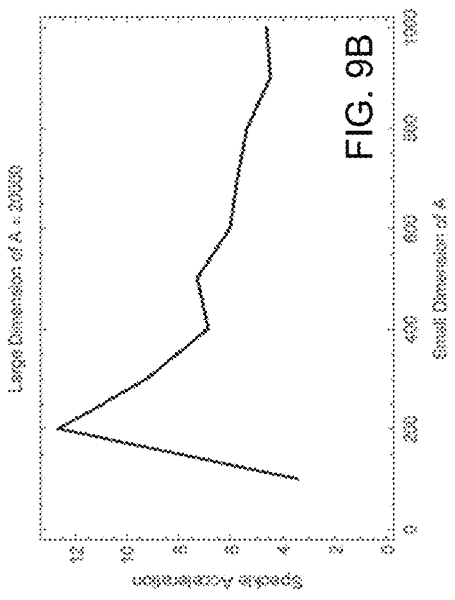

As noted above, performing an optical speckle transformation S of matrix elements can significantly accelerate appropriate linear algebra operations, e.g., RNLA operations such as described herein with reference to equations (1)-(3). FIGS. 8A-8B illustrate plots of exemplary acceleration that can be achieved using a previously known system for a linear algebra operation, and FIGS. 9A-9B illustrate plots of exemplary acceleration that can be achieved using an exemplary configuration of the present systems for a linear algebra operation. The acceleration can be considered to be the ratio of time required for finding the pseudoinverse of A to the time required for multiplying S times A and inverting (SA). FIG. 8A illustrates the acceleration in a simulated RNLA system (without the use of a multi-mode optic) as a function of the large dimension of A with the small dimension=200. FIG. 8B illustrates the acceleration in a simulated RNLA system (without the use of a multi-mode optic) as a function of the small dimension of A with the large dimension=20,000. The curves are averages over 100 trials for S, A and x given by pseudo-random numbers uniformly distributed between −1 and 1. All calculations included checks that solution to SAx=Sb (equation (2)) was the same to a specified precision as the solution to Ax=b (equation (1)) and were performed using Mathematica.

Note that the RNLA calculation has 2 parts, the matrix multiply SA and the inverse operation $(SA)^\dagger$, assuming that the random matrix S is precalculated. If the matrix multiply SA can be calculated in a time that is short compared to the time to perform $(SA)^\dagger$, the RNLA acceleration can be much greater, and such factor can be referred to as "speckle acceleration" such as plotted in FIGS. 9A-9B for similar parameters as used for FIGS. 8A-8B but also including use of a multi-mode optic to generate the transformations SA and Sb. The speckle acceleration can be considered to be the time to (multiply S times A plus time to obtain pseudoinverse of SA)/(time to obtain pseudoinverse of SA). FIG. 9A illustrates the speckle acceleration as a function of the large dimension of A with the small dimension=200. FIG. 9B illustrates the speckle acceleration as a function of the small dimension of A with the large dimension=20,000. The curves are averages over 100 trials for S, A and x given by pseudo-random numbers uniformly distributed between −1 and 1. All calculations included checks that solution to SAx=Sb (equation (2)) was the same to a specified precision as the solution to Ax=b (equation (2)) and were performed using Mathematica.

Figure 10:
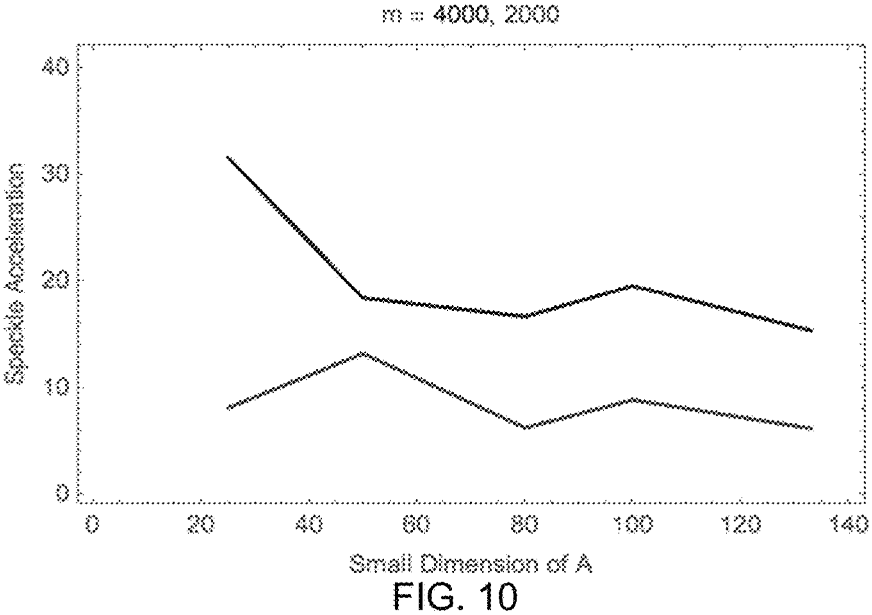
FIGS. 10 and 11 illustrate plots of comparative acceleration that can be achieved using an exemplary configuration of the present systems for a linear algebra operation.
Figure 11:
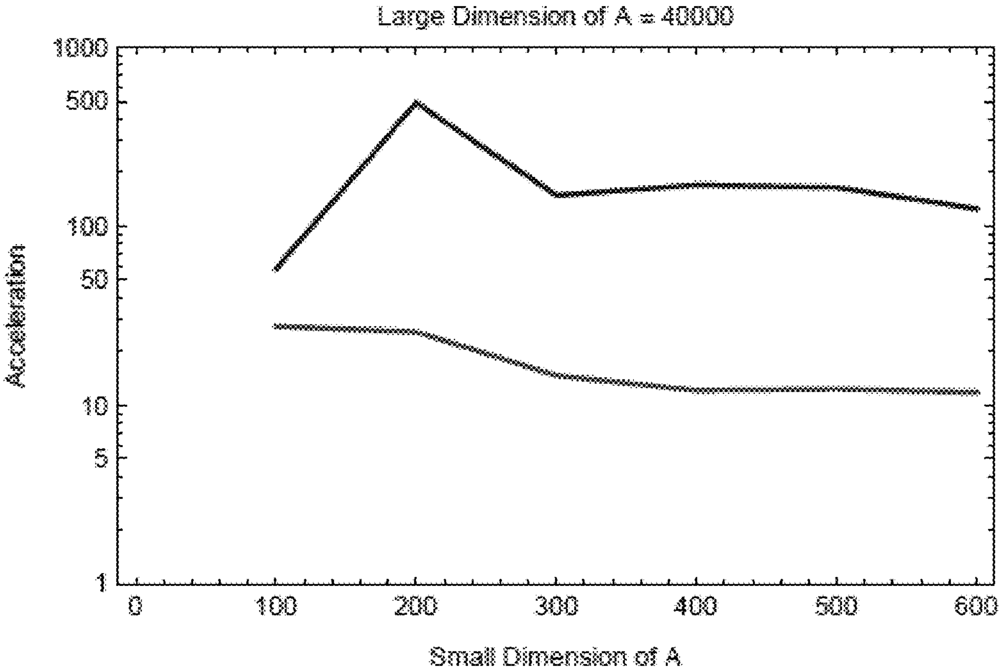

FIGS. 10 and 11 illustrate plots of comparative acceleration that can be achieved using an exemplary configuration of the present systems for a linear algebra operation. FIG. 10 shows the speckle acceleration factor calculated from the speckle matrix S and for A and x including only 1s and 0s. The 4000×m matrices (upper curve) were obtained by averaging 3 to 16 adjacent values of a calculated 4000×400 speckle transformation matrix S. Using the 4000×400 matrix directly, or a 4000×200 matrix, resulted in ill conditioned matrix errors for the inverse of SA, which result can be expected because the adjacent elements in S are correlated. A larger multi-mode optic can be used so as to achieve 400 independent rows of S. The 2000×m matrices (lower curve) were obtained from S by sampling every other value in each row. FIG. 10 validates in simulation that speckle random matrices in planar waveguides can achieve speckle acceleration factors as large as 30 for these parameters, even prior to optimization. The upper curve in FIG. 11 illustrates the RNLA acceleration with use of the present multi-mode optic to optically perform the transformation SA, and the lower curve illustrates the RNLA acceleration using only computation to perform the multiplication SA.

It can be understood from FIG. 11, and other disclosure herein, that the present systems and methods can significantly accelerate RNLA operations, e.g., can be used to reduce or eliminate the time necessary to calculate the random matrix S, the time to multiply S times A, and the time to multiply S times the vector b. For example, multiplication of S times A can take a time equal to $t_{SA}$=n m $t_{bit}$, where $t_{bit}$ is the duration of a single bit (matrix element) in one column of A. For an exemplary 100 Gbit/second modulator, $t_{bit}=10^{-11}$ seconds. For exemplary values of n=10,000 and m=200, $t_{SA}$=20 microseconds, which is 4000 times smaller than the approximately 80 ms that can be needed to perform the multiplication in a current processor. In a problem where A is fixed and the number of input values of b is large (e.g., on the order of 10,000s of thousands), the time for multiplying Sb can be particularly useful to reduce using the present systems and methods.

Figure 12:
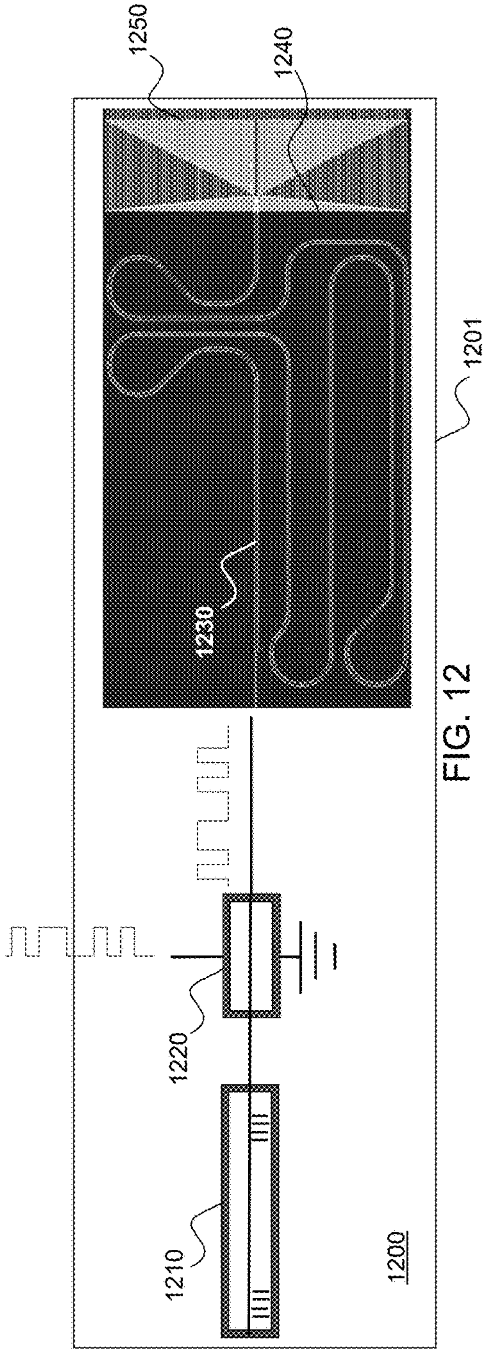
FIG. 12 schematically illustrates components of an integrated system for performing a linear algebra operation, according to one exemplary configuration.

Additionally, any suitable combination of elements of the present systems can be integrated in one or more suitable substrates. For example, FIG. 12 schematically illustrates components of an integrated system for performing a linear algebra operation, according to one exemplary configuration. System 1200 can include common substrate 1201 on which any suitable number of chirped optical carrier source 1210, modulator 1220 coupled to a matrix element source (not illustrated), multi-mode optic 1230, photodiode array 1240, and outputs 1250 to a bank of ADCs are integrated. Chirped optical carrier source 1210 can include, for example, a swept frequency distributed Bragg reflector (DBR) laser and electroabsorption (EA) modulator. In embodiments in which source 1210 includes an EA modulator, then system 1200 need not necessarily also include a separate modulator 1220. The matrix element source can be configured to input elements of matrix A and vector b into the EA modulator of source 1210 or into modulator 1220. The modulator can be configured to impose the matrix elements onto the chirped optical carrier. Multi-mode optic 1230 can be defined within the substrate and configured to receive the chirped optical carrier having the matrix elements imposed thereon and to output a speckle pattern based on the chirped optical carrier having the matrix elements imposed thereon, e.g., can include a multimode waveguide that generates speckle that produces SA and Sb. An array of optical sensors, e.g., photodiode array 1240, can be configured to be irradiated with the speckle pattern. System 1200 also can include a linear algebra processor coupled to the array of optical sensors, e.g., via outputs 1250 and ADCs (ADCs and processor not specifically illustrated) and configured to perform the linear algebra operation based on the speckle pattern. One or more of the optical carrier source, the modulator, the linear algebra processor, and the optical sensor (photodiode array) can be defined in or disposed on the substrate 1201. For example, in a hybrid integration implementation, the optical carrier and the modulator can be disposed on a first substrate, and the waveguide and photodiode array can be disposed on a second substrate that abuts the first substrate.

FIG. 13 schematically illustrates components of another integrated system for performing a linear algebra operation, according to one exemplary configuration. System 1300 can include common substrate 1301 on which any suitable number of chirped optical carrier source 1310, modulator 1320 coupled to a matrix element source (not illustrated), splitter 1360, first multi-mode optic 1330, second multi-mode optic 1331, optional first mode scrambler 1332, optional second mode scrambler 1333, first photodiode array 1340, second photodiode array 1341, and first and second outputs 1350, 1351 to respective banks of ADCs are integrated. Chirped optical carrier source 1310 can include, for example, a swept frequency distributed Bragg reflector (DBR) laser and electroabsorption (EA) modulator. In embodiments in which source 1210 includes an EA modulator, then system 1200 need not necessarily also include a separate modulator 1220. The matrix element source 1320 can be configured to input elements of matrix A and vector b into the EA modulator of source 1310 or modulator 1320. The modulator can be configured to impose the matrix elements onto the chirped optical carrier.

In the configuration illustrated in FIG. 13, splitter 1360 splits the chirped optical carrier, having the matrix elements imposed thereon, and provides a first portion of the split carrier to first multi-mode optic 1330 and a second portion of the split carrier to second multi-mode optic 1331. First and second multi-mode optics 1330, 1331 can be defined within the substrate and configured to receive respective portions of the chirped optical carrier having the matrix elements imposed thereon and to output a speckle pattern based on the chirped optical carrier having the matrix elements imposed thereon, e.g., each can include a multimode waveguide that generates speckle that produces SA and Sb. A first array of optical sensors, e.g., photodiode array 1340, can be configured to be irradiated with the speckle pattern from first multi-mode optic 1331, and a second array of optical sensors, e.g., photodiode array 1341, can be configured to be irradiated with the speckle pattern from second multi-mode optic 1331. System 1300 also can include a linear algebra processor coupled to the array of optical sensors, e.g., via outputs 1350, 1351 and ADCs (ADCs and processor not specifically illustrated) and configured to perform the linear algebra operation based on the speckle pattern. In some configurations such as described further above, different mode scramblers 1332, 1333 can be used for each waveguide (multi-mode optic) such that the speckle patterns are independent. Alternatively, in some configurations such as described earlier above, the outputs of the two waveguides (multi-mode optics) can be combined with opposite sign so as to generate an S transformation matrix with positive and negative numbers.

One or more of the optical carrier source, the modulator, the linear algebra processor, and the optical sensor (photodiode array) can be defined in or disposed on the substrate 1301. For example, in a hybrid integration implementation, the optical carrier and the modulator can be disposed on a first substrate, and the waveguide and photodiode array can be disposed on a second substrate that abuts the first substrate. In one example, a method is provided for performing a linear algebra operation that includes imposing matrix elements onto a chirped optical carrier; inputting into a multi-mode optic the matrix elements imposed on the chirped optical carrier; outputting by the multi-mode optic a speckle pattern based on the matrix elements imposed on the optical carrier; and performing a linear algebra operation on the matrix elements based on the speckle pattern. Nonlimiting examples of such a method are described further herein with reference at least to FIGS. 1A-1B, 2A-2D, 3, 4, 6, 7, 12, and 13.

In another example, a system is provided for performing a linear algebra operation that includes a modulator configured to impose matrix elements onto a chirped optical carrier; a multi-mode optic configured to receive the matrix elements imposed on the chirped optical carrier and to output a speckle pattern based on the matrix elements imposed on the chirped optical carrier; and a processor configured to perform a linear algebra operation on the matrix elements based on the speckle pattern. Nonlimiting examples of such a system are described further herein with reference at least to FIGS. 1A-1B, 2A-2D, 3, 4, 6, 12, and 13.

In another example, an integrated system is provided for performing a linear algebra operation that includes a substrate; a source of a chirped optical carrier; a modulator configured to impose matrix elements onto the chirped optical carrier; a multi-mode optic defined within the substrate and configured to receive the chirped optical carrier having the matrix elements imposed thereon and to output a speckle pattern based on the chirped optical carrier having the matrix elements imposed thereon; an array of optical sensors configured to be irradiated with the speckle pattern; and a linear algebra processor coupled to the array of optical sensors and configured to perform the linear algebra operation based on the speckle pattern. Nonlimiting examples of such an integrated system are described further herein with reference at least to FIGS. 1A-1B, 2A-2D, 3, 4, 6, 12, and 13.

While preferred embodiments of the invention are described herein, it will be apparent to one skilled in the art that various changes and modifications may be made. For example, it should be apparent that the systems and methods provided herein suitably may be used to perform any suitable type of linear algebra operation. The appended claims are intended to cover all such changes and modifications that fall within the true spirit and scope of the invention.

What is claimed:

1. A method for performing a linear algebra operation, the method comprising:
- imposing matrix elements onto a chirped optical carrier;
- inputting into a multi-mode optic the matrix elements imposed on the chirped optical carrier;
- outputting by the multi-mode optic a speckle pattern based on the matrix elements imposed on the optical carrier; and
- performing a linear algebra operation on the matrix elements based on the speckle pattern.

2. The method of claim 1, wherein the matrix elements comprise matrix elements of a first matrix and a second matrix.

3. The method of claim 2, wherein:
- the first matrix comprises a matrix A of dimension m,n;
- the second matrix comprises a vector b of dimension m; and
- the linear algebra operation comprises approximating the equation $Ax=b$.

4. The method of claim 3, wherein the multi-mode optic optically transforms each of matrix A and vector b by a speckle transformation S.

5. The method of claim 4, wherein:
- the speckle pattern output by the multi-mode optic comprises matrix elements of a matrix SA of dimension p,n and matrix elements of a vector Sb of dimension p; and
- the linear algebra operation comprises generating $\tilde{x}=(SA)^{\dagger}Sb$, where $\tilde{x}$ is approximately equal to x, and wherein † indicates a pseudo-inverse operation.

6. The method of claim 5, wherein:
- the speckle pattern output by the multi-mode optic is received at an array of p optical sensors coupled to analog-to-digital converters (ADCs),
- the p optical sensors generate electronic representations of portions of the speckle pattern respectively received by the p optical sensors and provide the electronic representations to the ADCs,
- the ADCs convert the electronic representations of the portions of the speckle pattern into digital representations of the portions of the speckle pattern, and
- wherein a processor receives the digital representations and generates $\tilde{x}=(SA)^{\dagger}Sb$ based on the digital representations.

7. The method of claim 6, wherein:
- the p optical sensors concurrently receive a first portion of the speckle pattern corresponding to matrix elements of a first column of the matrix SA at a first time;
- the p optical sensors concurrently receive a second portion of the speckle pattern corresponding to matrix elements of a second column of the matrix SA at a second time that is different from the first time;
- the p optical sensors concurrently receive a third portion of the speckle pattern corresponding to matrix elements of the vector Sb at a third time that is different from the first and second times; and
- the first, second, and third portions of the speckle pattern have different spatial distributions than one another.

8. The method of claim 7, wherein:
- the matrix elements of the first column of the matrix A are imposed on one or more first pulses of the chirped optical carrier;
- the matrix elements of the second column of matrix A are imposed on one or more second pulses of the chirped optical carrier at a different time than the one or more first pulses; and
- the matrix elements of the vector b are imposed on one or more third pulses of the chirped optical carrier at a different time than the one or more first pulses and the one or more second pulses.

9. The method of claim 4, wherein the speckle transformation S includes at least one negative value.

10. The method of claim 4, wherein the multi-mode optic comprises a multi-mode guided-wave optic configured so as to control a rank of the speckle transformation S.

11. The method of claim 10, wherein a length and width of the multi-mode guided-wave optic are selected so as to control a correlation between columns and rows of the speckle transformation S.

12. The method of claim 1, wherein at least some of the matrix elements are imposed onto the chirped optical carrier at different wavelengths than one another.

13. The method of claim 12, wherein at least some of the matrix elements are imposed onto the chirped optical carrier at different times than one another.

14. The method of claim 1, wherein at least one of the matrix elements has a negative value.

15. The method of claim 1, wherein the multi-mode optic transforms at least one of the matrix elements by a negative value.

16. A system for performing a linear algebra operation, the system comprising:

a modulator configured to impose matrix elements onto a chirped optical carrier;

a multi-mode optic configured to receive the matrix elements imposed on the chirped optical carrier and to output a speckle pattern based on the matrix elements imposed on the chirped optical carrier; and a processor configured to perform a linear algebra operation on the matrix elements based on the speckle pattern.

17. The system of claim 16, wherein the matrix elements comprise matrix elements of a first matrix and a second matrix.

18. The system of claim 17, wherein:

the first matrix comprises a matrix A of dimension m,n;

the second matrix comprises a vector b of dimension m; and the linear algebra operation comprises numerically approximating the equation Ax=b.

19. The system of claim 18, wherein the multi-mode optic is configured to optically transform each of matrix A and vector b by a speckle transformation S.

20. The system of claim 19, wherein:

the speckle pattern output by the multi-mode optic comprises matrix elements of a matrix SA of dimension p,n and matrix elements of a vector Sb of dimension p; and the linear algebra operation comprises generating $\tilde{x}=(SA)^{\dagger}Sb$, where $\tilde{x}$ is approximately equal to x, and wherein † indicates a pseudo-inverse operation.

21. The system of claim 20, comprising an array of p optical sensors coupled to analog-to-digital converters (ADCs), the p optical sensors being configured to receive the speckle pattern output by the multi-mode optic, the p optical sensors further being configured to generate electronic representations of portions of the speckle pattern respectively received by the optical sensors and provide the electronic representations to the ADCs, the ADCs being configured to convert the electronic representations of the portions of the speckle pattern into digital representations of the portions of the speckle pattern, and the processor being configured to receive the digital representations and generate $\tilde{x}=(SA)^{\dagger}Sb$ based on the digital representations.

22. The system of claim 21, wherein:

the p optical sensors are configured to receive concurrently a first portion of the speckle pattern corresponding to matrix elements of a first column of the matrix SA at a first time;

the p optical sensors are configured to receive concurrently a second portion of the speckle pattern corresponding to matrix elements of a second column of the matrix SA at a second time that is different from the first time;

the p optical sensors are configured to receive concurrently a third portion of the speckle pattern corresponding to matrix elements of the vector Sb at a third time that is different from the first and second times; and the first, second, and third portions of the speckle pattern have different spatial distributions than one another.

23. The system of claim 22, wherein:

the matrix elements of the first column of the matrix A are imposed on one or more first pulses of the chirped optical carrier;

the matrix elements of the second column of matrix A are imposed on one or more second pulses of the chirped optical carrier that are at a different time than the one or more first pulses; and the matrix elements of the vector b are imposed on one or more third pulses of the chirped optical carrier that are at a different time than the one or more first pulses and the one or more second pulses.

24. The system of claim 19, wherein the multi-mode optic is configured such that the speckle transformation S includes at least one negative value.

25. The system of claim 19, wherein the multi-mode optic comprises a multi-mode guided-wave optic configured so as to control a rank of the speckle transformation S.

26. The system of claim 25, wherein a length and width of the multi-mode guided-wave optic are selected so as to control a correlation between columns and rows of the speckle transformation S.

27. The system of claim 16, wherein at least some of the matrix elements are imposed onto the chirped optical carrier at different wavelengths than one another.

28. The system of claim 27, wherein at least some of the matrix elements are imposed onto the chirped optical carrier at different times than one another.

29. The system of claim 16, wherein at least one of the matrix elements has a negative value.

30. The system of claim 16, wherein the multi-mode optic transforms at least one of the matrix elements by a negative value.

31. An integrated system for performing a linear algebra operation, the integrated system comprising:

a substrate;

a laser configured to generate a chirped optical carrier;

a modulator configured to impose matrix elements onto the chirped optical carrier;

a multi-mode optic defined within the substrate and configured to transform the chirped optical carrier, having the matrix elements imposed thereon, into a speckle pattern;

an array of optical sensors configured to be irradiated with the speckle pattern; and a linear algebra processor coupled to the array of optical sensors and configured to perform the linear algebra operation on the matrix elements based on a representation of the speckle pattern.

32. The system of claim 31, wherein one or more of the laser, the modulator, the linear algebra processor, and the array of optical sensors are defined in or disposed on the substrate.

* * * * *